US005581702A

United States Patent [19]

McArdle et al.

[11] Patent Number: 5,581,702
[45] Date of Patent: Dec. 3, 1996

[54] COMPUTER CONFERENCING SYSTEM FOR SELECTIVELY LINKING AND UNLINKING PRIVATE PAGE WITH PUBLIC PAGE BY SELECTIVELY ACTIVATING LINKED MODE AND NON-LINKED MODE FOR EACH PARTICIPANT

[75] Inventors: Brian McArdle; Dan Porter; Lewis V. Rothrock, all of Beaverton; Tyler R. Thessin, Portland, all of Oreg.

[73] Assignee: Intel Corporation, Santa Clara, Calif.

[21] Appl. No.: 170,146

[22] Filed: Dec. 20, 1993

[51] Int. Cl.$^6$ .................................................. G06F 13/00
[52] U.S. Cl. ...................... 395/200.04; 370/261; 379/202
[58] Field of Search ...................................... 395/200, 153, 395/158, 162, 155, 156, 157, 200.01, 200.02, 200.04, 200.09; 370/62; 379/202

[56] References Cited

U.S. PATENT DOCUMENTS

| | | | |
|---|---|---|---|
| 5,008,853 | 4/1991 | Bly et al. | 395/153 |
| 5,089,956 | 2/1992 | MacPhail | 395/600 |
| 5,107,443 | 4/1992 | Smith | 395/158 |
| 5,208,912 | 5/1993 | Nakayama et al. | 395/200.04 |
| 5,220,657 | 6/1993 | Bly et al. | 395/479 |
| 5,247,615 | 9/1993 | Moni et al. | 395/200.04 |
| 5,339,389 | 8/1994 | Bates et al. | 395/153 |
| 5,353,398 | 10/1994 | Kitahara et al. | 395/153 |
| 5,363,507 | 11/1994 | Nakayama et al. | 395/800 |
| 5,388,196 | 2/1995 | Pajak et al. | 395/153 |
| 5,392,400 | 2/1995 | Berkowitz et al. | 395/200.01 |

Primary Examiner—Thomas C. Lee
Assistant Examiner—Moustafa Mohamed Meky
Attorney, Agent, or Firm—Blakely, Sokoloff, Taylor & Zafman

[57] ABSTRACT

An apparatus and method for lining public and private pages in a conferencing system is disclosed. In a computer conferencing system having a plurality of participants coupled by a communication medium, a process for linking public and private pages comprises the steps of: 1) collecting public meeting information generated by any of the plurality of participants, the public meeting information including at least one public page of annotations; 2) collecting private meeting information from a local participant in which the meeting manager is resident, the private meeting information being different from the public meeting information, the private meeting information not accessible to the plurality of conference participants other than the local participant, the private meeting information including at least one private page of annotations; and 3) selectively linking the private page with the public page, the private page being implicitly accessed when the linked public page is explicitly accessed. The process further includes the steps of: 1) maintaining a public page list representing a plurality of public pages, the step of maintaining a public page list further including a step of linking the plurality of public pages together in the public page list; 2) maintaining a private page list representing a plurality of private pages, the step of maintaining a private page list further including a step of linking the plurality of private pages together in the private page list; and 3) linking pages of said public page list with pages of said private page list.

10 Claims, 29 Drawing Sheets

COMPUTER CONFERENCING SYSTEM FOR SELECTIVELY LINKING AND UNLINKING PRIVATE PAGE WITH PUBLIC PAGE BY SELECTIVELY ACTIVATING LINKED MODE AND NON-LINKED MODE FOR EACH PARTICIPANT

BACKGROUND OF THE INVENTION

1. Field of the Invention

The present invention relates to the field of networked computer systems. Specifically, the present invention relates to the field of sharing information in a computer conferencing system

2. Description of Related Art

A set of personal computers interconnected on a network can be effectively used as a data conferencing system. In such a system, each conference participant typically comprises a personal computer user having a computer, a display screen, a computer network interface and typically a mouse or cursor control device. Conference participants is are linked together by a computer network. This network may comprise either a hardwired local area network (LAN) such as Ethernet, a telephone modem link or other conventional data communications network. Because the conference participants are linked via a computer network, the participants do not need to be located in the same physical space. Rather, an effective conference may be carried out as participants view common information on their local display screens and manipulate information using their local cursor control devices or other input devices.

Several problems are present in these prior art conferencing systems. In a typical conferencing application, a group of conference participants linked via a network share common information pertaining to a particular meeting or topic under discussion. By sharing information between conference participants, each participant is able to view and manipulate the information dispersed during the meeting. Immediately after a meeting is initiated, a pool of information collected during the meeting begins to accumulate. As each conference participant makes modifications or additions to this pool of meeting information, the individual contributions must be circulated around to the other conference participants so that each participant has a complete and up-to-date copy of the meeting information. It will be appreciated that maintaining synchronization and currency of the meeting information among all conference participants is a difficult task and may involve the transfer of large amounts of information. This task is complicated by the fact that during the course of the meeting, individual conference participants may choose to create their own independent private pool of information that relates in some way to the meeting or topic under discussion. As is the case during a face-to-face meeting, some information is shared among the meeting participants and other information or notes are kept private to a particular participant. Prior art conferencing systems have been unable to provide a means for maintaining private conference information.

It is a further problem in prior art conferencing systems that private information cannot be linked to public conference information in some meaningful way. In a typical conferencing scenario, an individual conference participant may take private notes that relate to the public subject matter under discussion at the conference. Thus, it is convenient to associate or link private notes with corresponding public conference subject matter. Prior art systems have been unable to provide a means for linking public and private information in a conferencing system.

Thus, a better method and apparatus for linking public and private information in a conferencing system is needed.

SUMMARY AND OBJECTS OF THE PRESENT INVENTION

The present invention is an apparatus and method for linking public and private pages in a conferencing system. In a computer conferencing system having a plurality of participants coupled by a communication medium, a process is disclosed for linking public and private pages. This process comprises the steps of: 1) collecting public meeting information generated by any of the plurality of participants, the public meeting information including at least one public page of annotations; 2) collecting private meeting information from a local participant in which the meeting manager is resident, the private meeting information being different from the public meeting information, the private meeting information not accessible to participants of the plurality of conference participants other than the local participant, the private meeting information including at least one private page of annotations; and 3) selectively linking the private page with the public page, the private page being implicitly accessed when the linked public page is explicitly accessed. The process of the present invention further includes the steps of: 1) maintaining a public page list representing a plurality of public pages, the step of maintaining a public page list further including a step of linking the plurality of public pages together in the public page list; 2) maintaining a private page list representing a plurality of private pages, the step of maintaining a private page list further including a step of linking the plurality of private pages together in the private page fist; and 3) linking pages of said public page list with pages of said private page list.

It is therefore an advantage of the present invention to provide an apparatus and method for linking public and private pages in a conferencing system. It is a further advantage of the present invention to provide a separate display screen area for public and private information. It is a further object of the present invention that annotations or objects created on a display screen are either automatically transferred to other conference participants or kept private as solely determined by the screen area in which the annotation or object is placed on the display screen. It is a further advantage of the present invention to provide a means for linking public and private pages together. It is a further advantage of the present invention to provide a means for linking and unlinking private and public pages.

These and other advantages of the present invention are fully described in the following detailed description of the preferred embodiment.

DETAILED DESCRIPTION OF THE PREFERRED EMBODIMENT

The present invention is an apparatus and method for linking public an private pages in a conferencing system. In the following detailed description, numerous specific details are set forth in order to provide a thorough understanding of the present invention. However, it will be apparent to one of ordinary skill in the art that these specific details need not be used to practice the present invention. In other instances, well known structures, interfaces and processes have not been shown in detail in order not to unnecessarily obscure the present invention.

Figure 1:
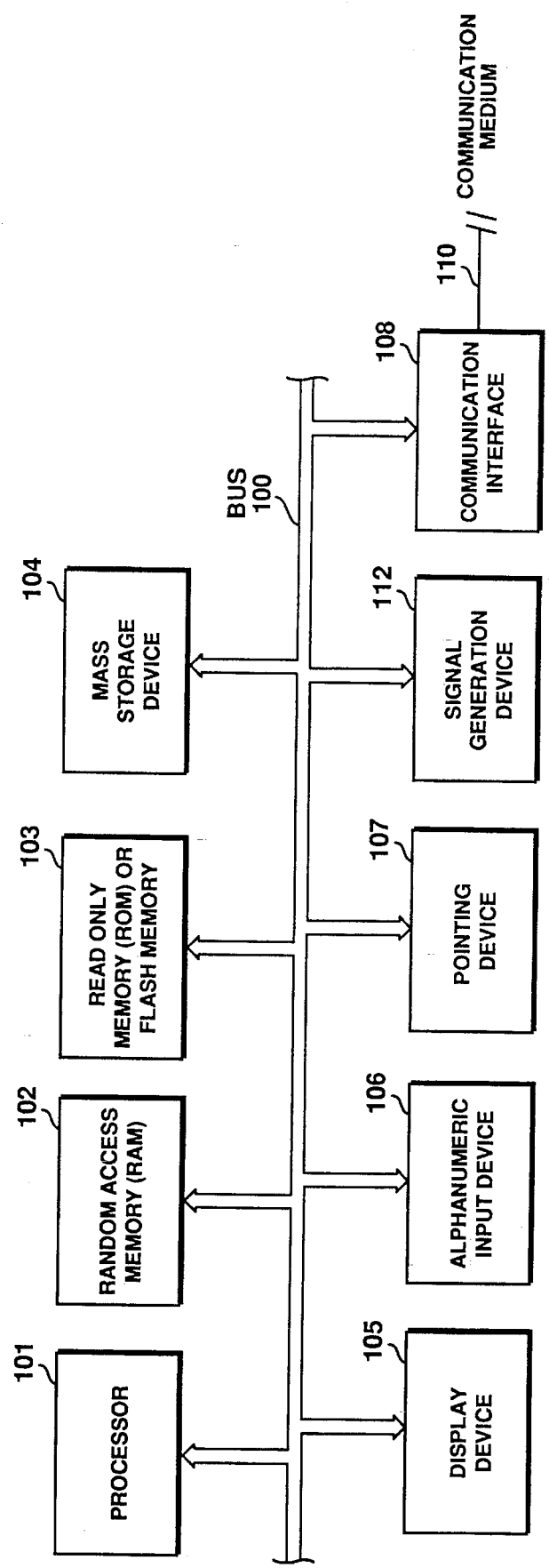
FIG. 1 is a block diagram illustrating the computer system hardware used in the preferred embodiment of the present invention.

Referring now to FIG. 1, a block diagram of the computer system hardware used in the preferred embodiment is illustrated. The computer system used in the preferred embodiment comprises a Bus 100 for communicating information between computer system components. These components coupled to Bus 100 include Processor 101. In the preferred embodiment, Processor 101 is an i486 or Pentium brand microprocessor manufactured by Intel Corporation, Santa Clara, Calif. The i486 and Pentium marks are trademarks of Intel Corporation. Other system components include Random Access Memory (RAM) 102, Read Only Memory (ROM) 103, and mass storage device or disk drive 104. The computer system of the preferred embodiment also includes display device 105 coupled to the Bus 100 for displaying information to a computer user, an alphanumeric input device 106 coupled to the Bus 100 for communicating information and command selections to the Processor 101, a pointing device or cursor control device 107 coupled to the Bus 100 for communicating information and command selections to Processor 101, and a signal generation device 112 coupled to the Bus 100 for communicating command selections to the Processor 101. Display device 105 may be a liquid crystal device, cathode ray tube, or other suitable display device. Alphanumeric input device 106 is typically an alphanumeric or function key keyboard. Pointing device or cursor control device 107 is typically a mouse or trackball device allowing the computer user to dynamically signal the two dimensional movement of a visible symbol (i.e. cursor) on the display screen of display device 105. Many implementations of the cursor control device 107 are well known in the art, including trackball, mouse, joystick, or special keys on the alphanumeric input device 106 capable of signaling movement in a given direction. Signal generation device 112 is typically implemented as a button or switch located on or near the cursor control device 107. The physical proximity of cursor control device 107 and signal generation device 112 allows a user to manipulate both devices simultaneously with one hand. The signal generation device may be operated between two control states: an active control state typically initiated by depression of a mouse button, and an inactive control state typically initiated by releasing the mouse button.

The computer system used in the preferred embodiment also includes a communication interface 108. Communication interface 108 is coupled to communication medium 110. Communication interface 108 provides a means for the computer system to communicate with a network of other computer systems. A variety of other networks are well known in the art. These communication media 110 include well known Local Area Networks (LAN) such as Ethernet, Wide Area Networks (WAN), telephone modem links, or other well known and conventional computer networking technology. The configuration and interconnection of computer system components as illustrated in FIG. 1 is well known to those of ordinary skill in the art.

Figure 2:
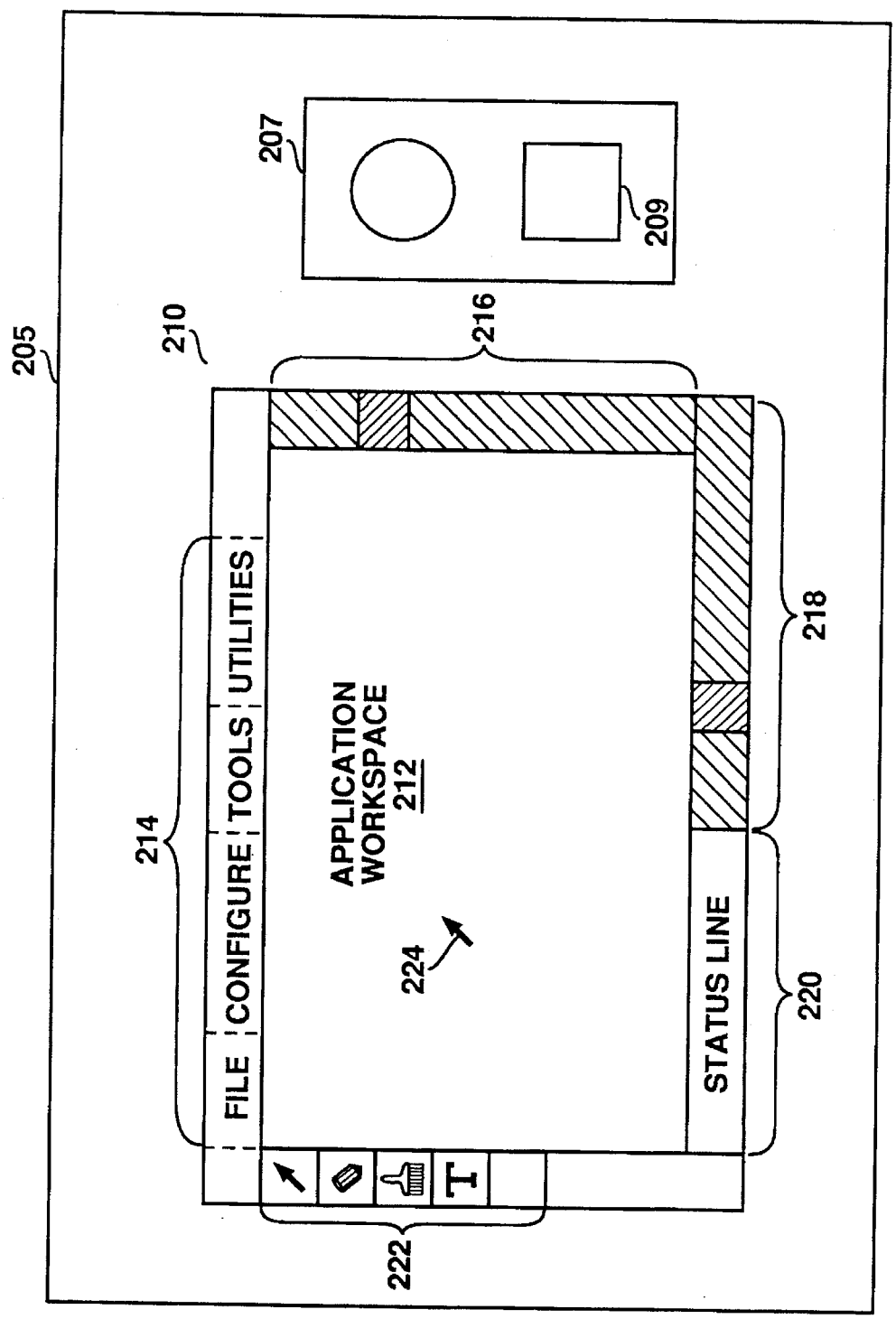
FIG. 2 illustrates a typical screen display provided in a convention computer system.

Referring now to FIG. 2, a screen display 210 on a conventional computer system is illustrated. In addition, a cursor control device 207 (i.e. mouse) and signal generation device 209 (mouse button) is illustrated. Conventional screen display 210 comprises a displayed set or menu of function or command selections 214 displayed across the top of the display screen. In addition, tool selections 222 are displayed along a left hand edge of the display screen. Vertical scroll bar 216 and horizontal scroll bar 218 is also provided. A status line 220 provides a display region for various system status messages. This typical screen display 210 and corresponding user interface functionality is available in the prior art from various sources including the Windows operating system developed by Microsoft Corporation of Redmond, Washington, or various operating systems and applications running on the Apple Macintosh brand computer systems manufactured by Apple Computer, Inc. of Cupertino, Calif. Microsoft is a trademark of Microsoft, Inc. Apple and Macintosh are trademarks of Apple Computer, Inc.

Screen display 210 includes an application workspace 212 in which a user may draw images or type text using one of tools 222. In addition, a cursor symbol 224 is displayed and responsive to the movement to cursor control device 207. Cursor 224 provides a means for pointing to various regions on display screen 210. Again, the use of cursor symbol 224 is well known to those of ordinary skill in the art.

Figure 3:
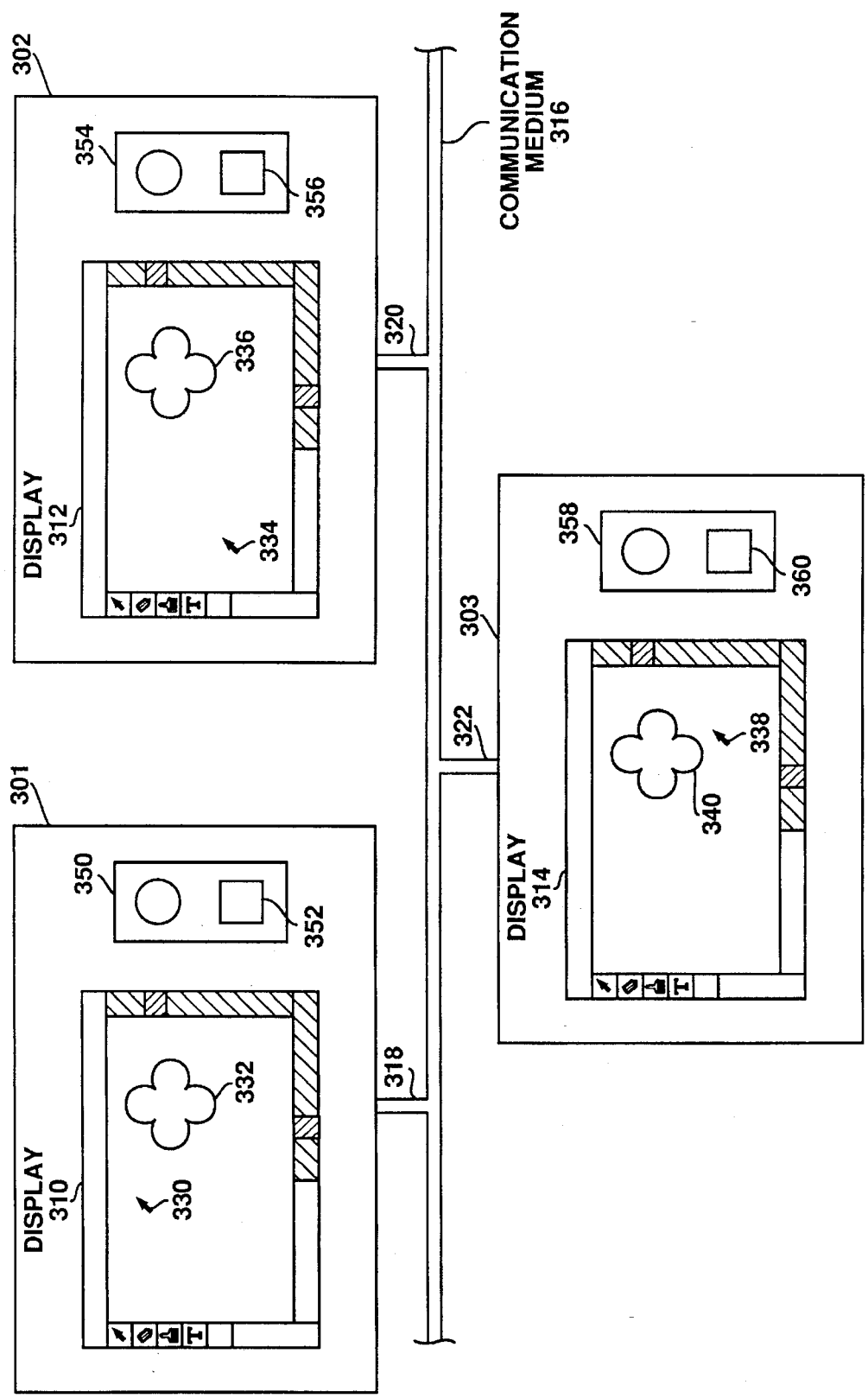
FIG. 3 illustrates a conventional computer system network having three independent computer systems interconnected on a communication medium.

Referring now to FIG. 3, a conventional computer network or conferencing system is illustrated. This sample conferencing system includes three computer systems, 301, 302 and 303, all coupled via communication medium 316. As described earlier, these computer systems, 301, 302 and 303, and the communication medium 316 over which they communicate are well known to those of ordinary skill in the art. Conventional computer system 301 includes a screen display 310, cursor control device 350, and mouse button 352. Cursor control device 350 is used to manipulate cursor symbol 330 on display 310. Because cursor 330 of display 310 is manipulated using cursor control device 350 of the same computer system 301, cursor 330 is called the local cursor of computer system 301. Any arbitrary object 332 may be displayed on display screen 310. Similarly, computer system 302 comprises display screen 312, cursor control device 354, and signal generation device 356. Local cursor 334 of display screen 312 is controlled by cursor control device 354. Computer system 303 comprises display screen 314, cursor control device 358, and signal generation device 360. Local cursor 338 of the display screen 314 is controlled via cursor control device 358.

Prior art networking systems provide means for transferring objects from one computer system to another across communication medium 316. For example, object 332 displayed on display 310 may be transferred via interface 318 across communication medium 316 to computer system 302 and/or computer system 303. In this manner, object 332 may be displayed on display 312 as object 336 and/or displayed on display 314 as object 340. Thus, information may be shared among computer systems 301, 302, and 303. Typically, cursors 330, 334, and 338 act as local cursors to the computer systems on which they are displayed.

Figure 4:
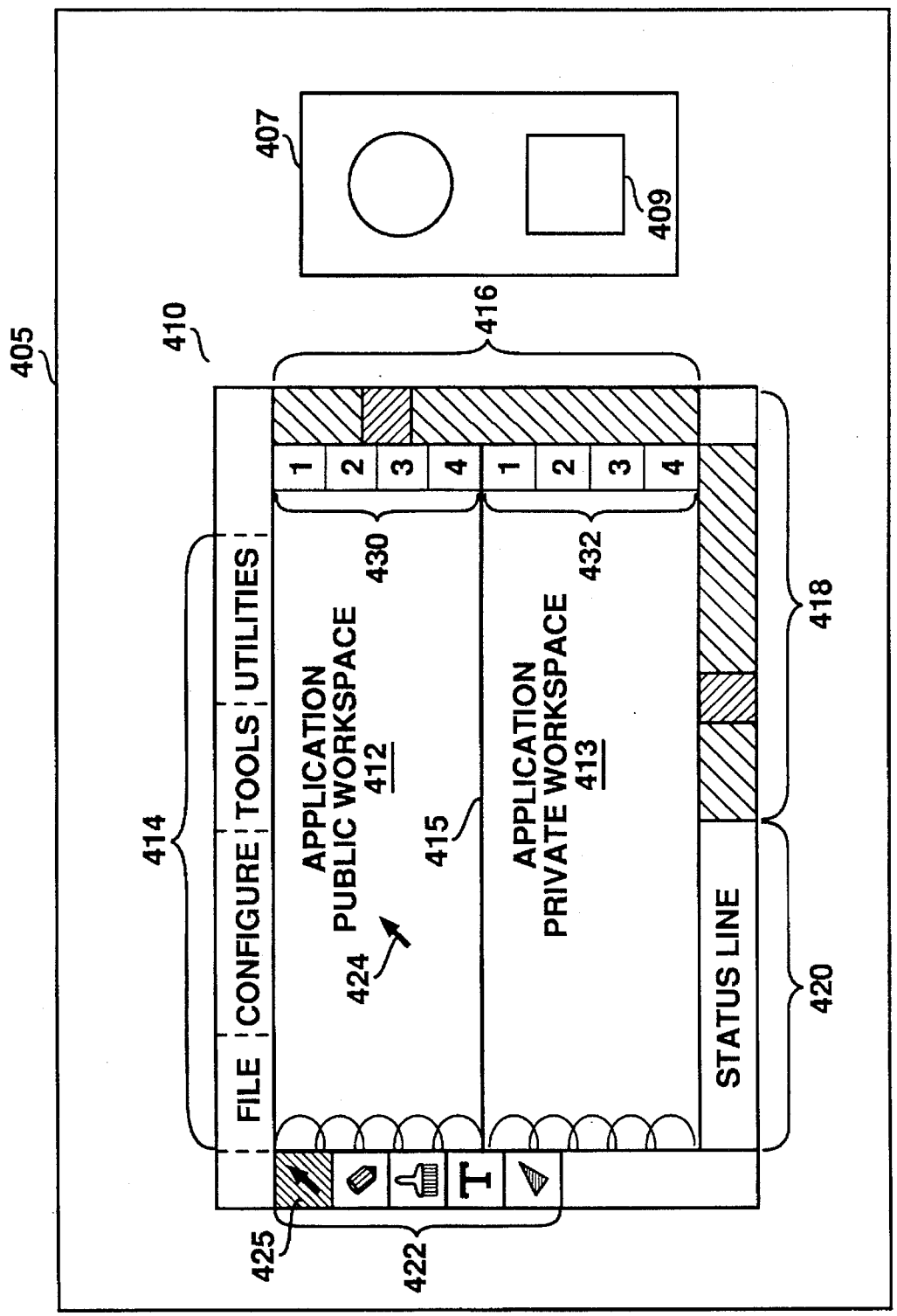
FIG. 4 illustrates the screen display provided by the preferred embodiment of the present invention. This screen display illustrates the public and private workspaces of the present invention.

Referring now to FIG. 4, a screen display 410 provided in the preferred embodiment of the present invention is illustrated. Screen display 410 includes prior art elements such as the function or command menu 414, the tool palette 422, the vertical scroll bar 416, the horizontal scroll bar 418, and optional status line 420. The preferred embodiment also uses cursor control device 407 and signal generation device or mouse button 409. In a unique diversion from the prior art, the present invention bisects the application workspace into application public workspace 412 and application private workspace 413 separated by line 415. Application public workspace 412 defines a region of display 410 that is visible to other conference participants on a network, such as the one illustrated in FIG. 3 and FIG. 4. A user of computer system 405 can select tools from tool palette 422 and draw or type annotations or objects within application public workspace 412. Any annotations or objects drawn in this region are transmitted across the conferencing network as data messages. In this manner, annotations or objects drawn on a first conference participant display are visible to other conference participants on the network. Scroll bars 416 and 418 may be used in a conventional manner to select in two dimensions the portion of application public workspace 412 visible within display 410. The border 415 between application public workspace 412 and application private workspace 413 may be vertically moved using cursor control device 407 and signal generation device 409 in order to selectively modify the size of public workspace 412 and private workspace 413. In the preferred embodiment, local cursor 424 is positioned using cursor control device 407 over border line 415. Signal generation device 409 may then be activated to initiate movement of border 415. With signal generation device 409 activated (i.e. depressed), cursor 424 is moved vertically using cursor control device 407. As this movement occurs with signal generation device 409 activated, border 415 is moved vertically with cursor 424 until signal generation device 409 is deactivated. At this point, border 415 is left at the cursor position where signal generation device 409 was deactivated. Border 415 may be moved across the entire vertical range of the application workspace within display 410. Application private workspace 413 comprises a region of display 410 wherein objects or annotations created are not transmitted to other conference participants. Annotations and objects created in application private workspace 413 using tools of tool palette 422 are only visible on the local display 410 of the computer system 405 on which the private annotations or objects were created. Thus, by creating annotations or objects in either the public workspace 412 or private workspace 413, a user can quickly discern if the objects or annotations created will be visible to other conference participants.

Both application public workspace area 412 and application private workspace are 413 are further partitioned into a plurality of pages. Each page is an instance of data to be displayed within a given workspace. Each page has a corresponding unique page identifier. A public page is a page displayed in application public workspace 412 wherein the contents of the page are transmitted to other conference participants. There is always one or more public pages available to a user. Referring to FIG. 4, public page tabs 430 provide a means for selecting a desired page within application public workspace 412. By positioning a cursor within tab areas defined within public tabs 430, a particular public page can be selected.

A private page is a page displayed within application private workspace 413. The contents of a private page are available only locally to the local user. The contents of a private page are not transmitted to other conference participants. Referring to FIG. 4, private page tabs 432 provide a means for selecting a particular private page of application private workspace 413. By positioning a cursor within the tab areas defined for private tabs 432, a particular private page can be selected and brought into view.

A page list is maintained for both application public workspace 412 and application private workspace 413. The page list is a list of all the pages that exist within a given workspace. There is a public page list and a private page list. The order of the public page list is the page order. The private page order is dependent on whether a linked page mode or a non-linked page mode has been previously selected. In linked mode, every public page that exists has a linked private page associated with it. For each public page, the linked private page is unique and is displayed with the corresponding public page. If there is no data in a private page, a virtual private page is created until data (i.e. an annotation) is added to the page. A virtual page is a placeholder for a real page and is maintained separately from either the private page list or the public page list. Once data is entered into a virtual page, a real private page is created and inserted into the current private page list. In a linked mode, the newly created private page is linked to a corresponding public page. In a non-linked mode, the public and private pages are not associated. The public pages are available for display in order as determined by the public page list. In addition, all private pages are available in an order determined by the private page list.

Figure 5:
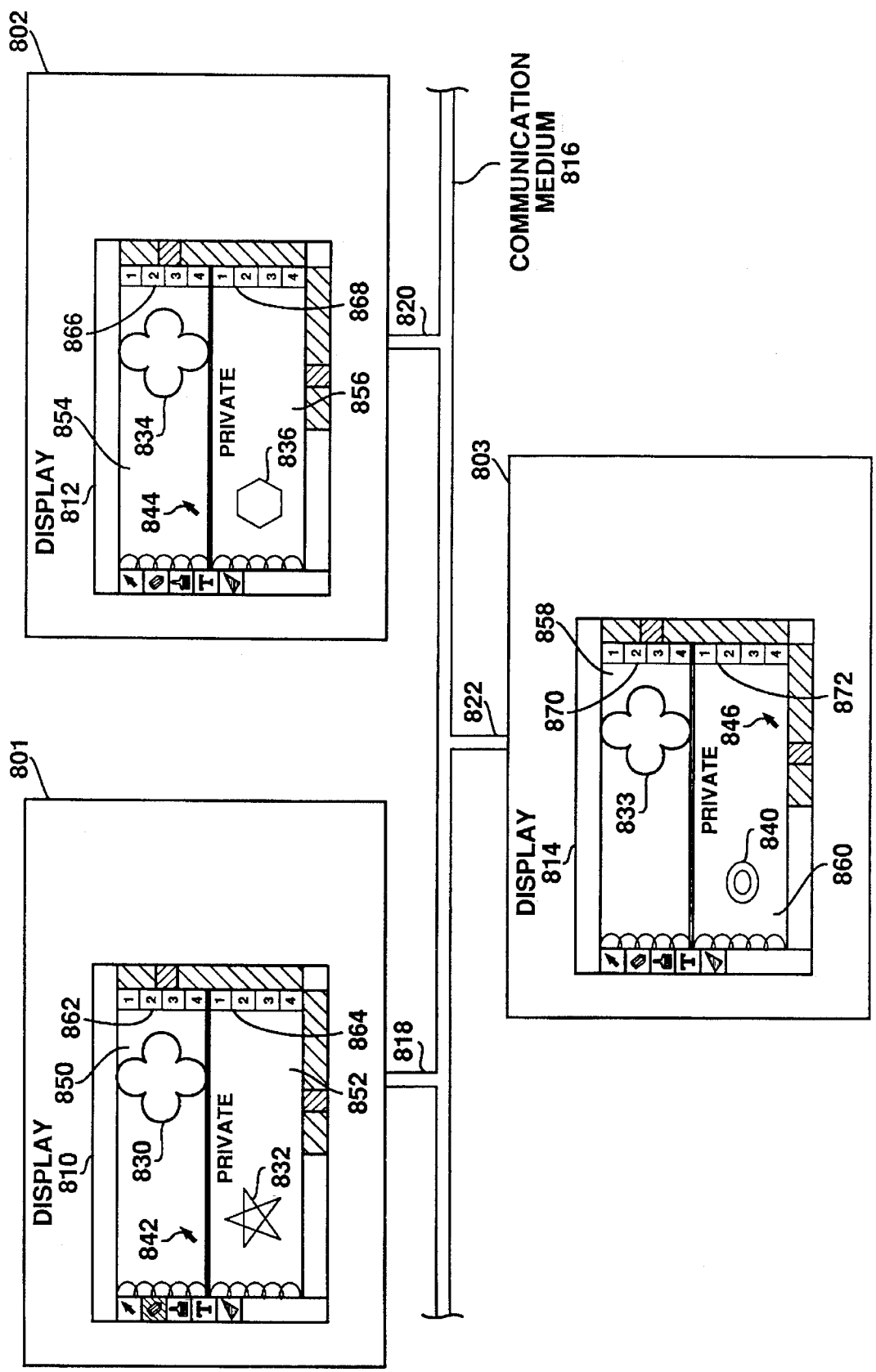
FIG. 5 illustrates a set of three networked computer users in a conferencing situation, each having public and private pages displayed on their systems.

Referring now to FIG. 5, an example of a screen display illustrates the present invention as used in a conferencing environment. As shown in FIG. 5, three conference participants, 801, 802 and 803, are illustrated as coupled via communication medium 816. Each conference participant comprises a display, a cursor control device and a signal generation device or mouse button. In the example illustrated in FIG. 5, conference participant 801 is displaying an object or annotation 830 within its application public workspace 850. Because this object resides in the application public workspace 850, a corresponding object or annotation 834 appears in the application public workspace 854 of conference participant 802. Similarly, object 833 appears in the application public workspace 858 of conference participant 803. Each conference participant may select a particular page for view within its application public workspace. For example, public tabs 862 are used to select a particular public page for display by conference participant 801.

Each conference participant also has a private workspace, the contents of which are not displayed to other conference participants. For example, object or annotation 832 is displayed within application private workspace 852 on the display screen of conference participant 801. A corresponding annotation or object is not displayed on the display screen of other conference participants. Similarly, other conference participants may display their own private information within their own application private workspace. As with the application public workspace, a particular page of the application private workspace may be selected using page tabs. For example, page tabs 864 can be used to select a particular private page for view by conference participant 801.

Figure 6:
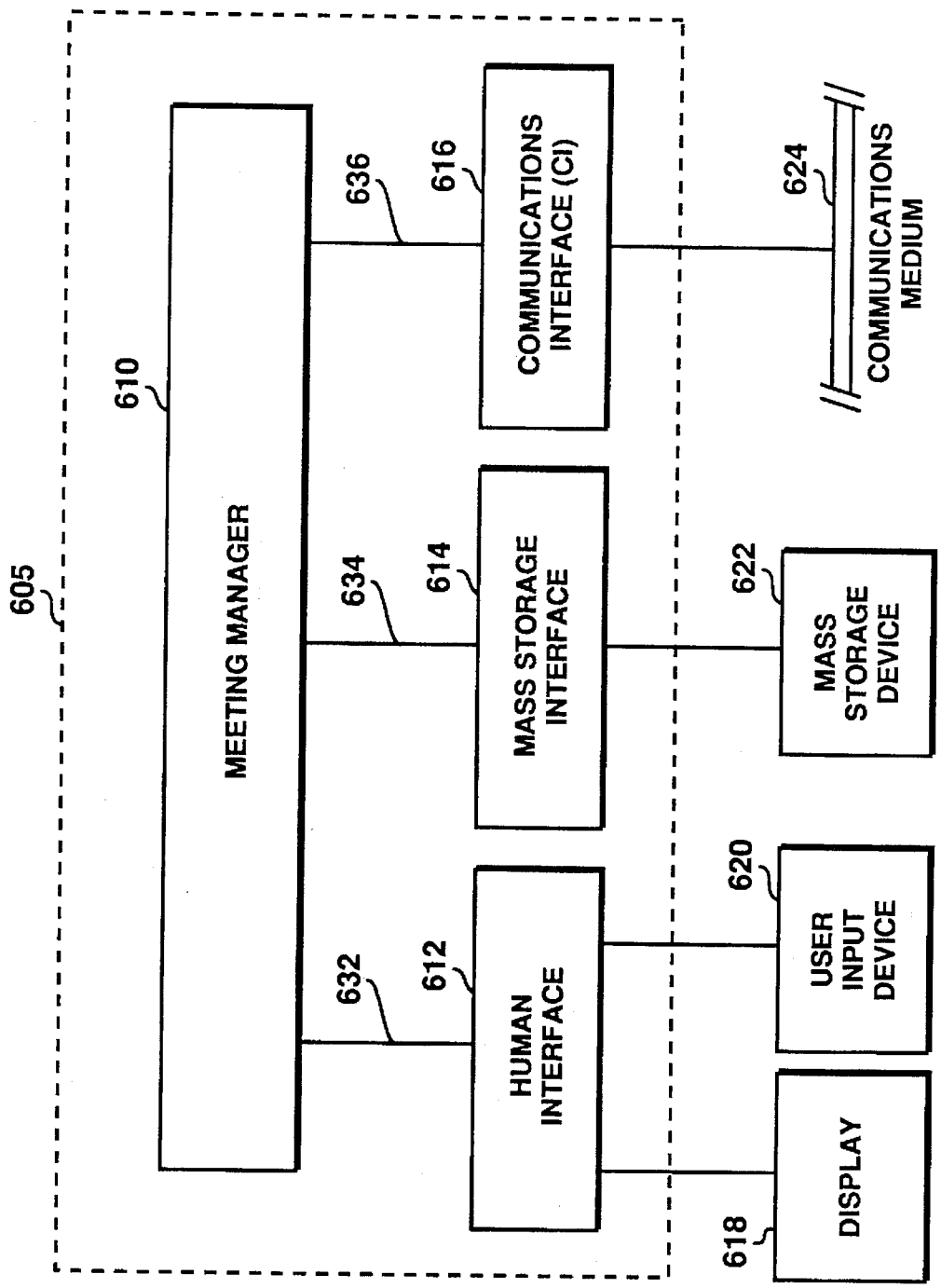
FIG. 6 illustrates a block diagram showing the basic architecture of the software of the present invention.

Referring now to FIG. 6, a block diagram of the software architecture 605 of the present invention is illustrated. The present invention comprises software operably disposed within random access memory (RAM) 102 and executed by processor 101. The software 605 of the present invention comprises a meeting manager component 610, a human interface component 612, a Communications Interface (CI) component 616, and an optional mass storage interface component 614. The meeting manager 610 comprises data structures and processing logic for implementing the features of the present invention. These data structures and the processing logic of meeting manager 610 are the subject of FIGS. 10–40 as presented in detail in the remaining portions of the detailed description of the preferred embodiment provided herein.

Human interface component 612 comprises processing logic for displaying information on display device 618 and for processing user input provided through user input device 620. User input device 620 includes alphanumeric input device 106, pointing device or cursor control device 107, a signal generation device or mouse button 112, and other conventional devices for providing user input to a computer system. The human interface 610 in the preferred embodiment of the present invention performs mainly a function of displaying status information to a user on display device 618. Conventional methods exist for providing this display function. In other situations, human interface 612 provides command selections and other information to meeting manager 610 via interface 632. The information so provided will be described below in connection with the detailed description of meeting manager 610.

The preferred embodiment provides a capability for storing meeting information on a mass storage device or hard disk 622. Similarly, previously stored meeting information may be retrieved from mass storage device 622 through mass storage interface 614 and provided to meeting manager 610. The permanent storage of meeting information is advantageous in the present invention; because, conference participants may disconnect from a meeting and retain the meeting information generated up to that point on mass storage device 622. At a subsequent time, the conference participant may rejoin the meeting and recover the information previously stored on mass storage device 622 either independently or after rejoining the meeting in progress or a subsequent meeting. This capability allows a more efficient synchronization of information with other conference participants. The technique for joining conference participants is the subject of co-pending patent application Ser. No. 08/170,398, filed concurrently with the present application still pending. The low level details of mass storage interface 614 and mass storage device 622, however, are well known to those of ordinary skill in the art.

Communications Interface (CI) 616 provides an interface with communications medium 624. The techniques of the present invention are generally applicable to any computer network or data communication medium including local area networks (LAN), wide area networks (WAN), telephone modems communication links, wireless communications links, or any other form of communications medium. Any data communications medium providing a capability for conferencing two or more conference participants can benefit by the techniques taught by the present invention. Thus, the communications interface component 616 comprises processing logic and data specific to the communications medium 624 being used for a particular conferencing application. These low level communications interface details for a particular network are well known to those of ordinary skill in the art. In addition, techniques for message passing across a network are well known in the art. In general, communications interface 616 provides an indication to meeting manager 610 across interface 636 when a new conference participant connects to communications medium 624 or when a message transferred across communications medium 624 arrives for processing by meeting manager 610. In either of these two cases, communications interface 616 provides notification and messages to meeting manager 610 across interface 636.

Figure 7:
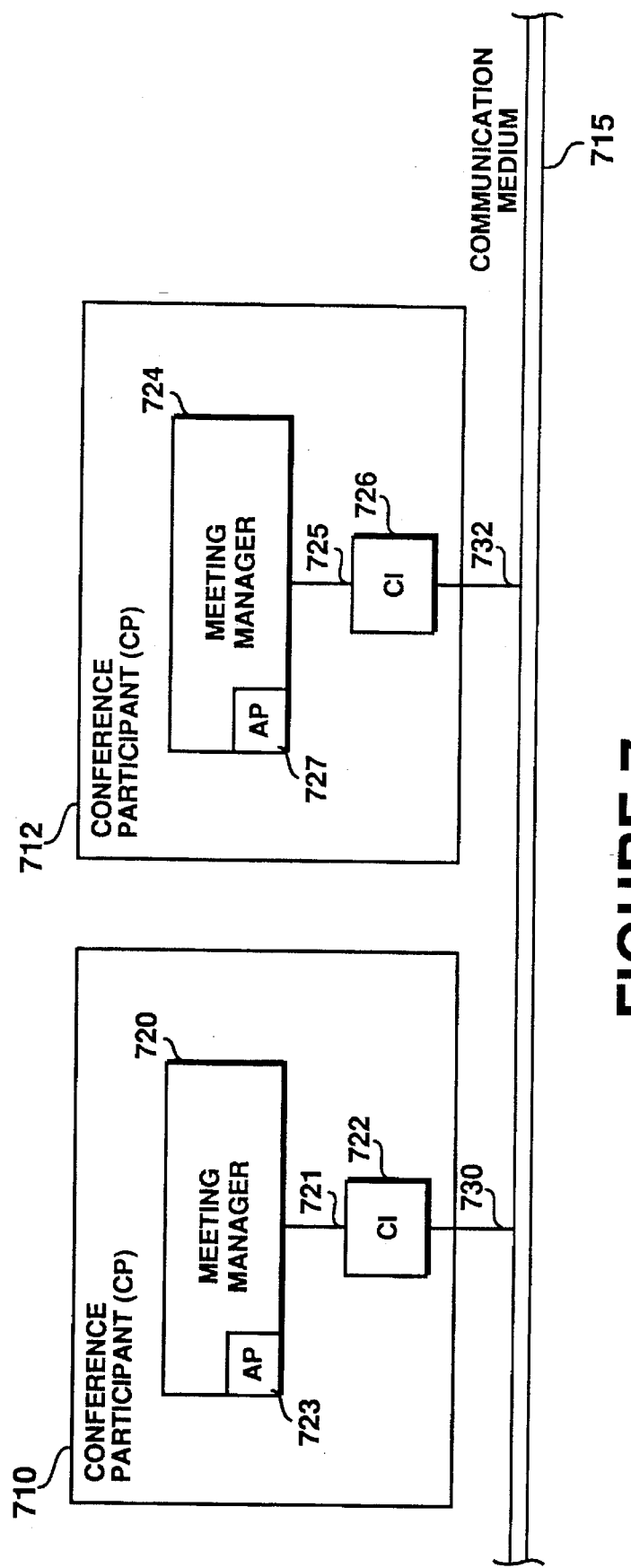
FIG. 7 illustrates a typical conferencing network comprising two conference participants.

Referring now to FIG. 7, a typical example of a data conferencing configuration using the present invention is illustrated. This sample data conferencing configuration comprises two conference participants 710 and 712 coupled via communications medium 715. It will be apparent to one of ordinary skill in the art that any number of conference participants may be joined via a communications medium in the manner as illustrated in FIG. 7. In the example of FIG. 7, each of the conference participants 710 and 712 execute the meeting manager processing logic of the present invention. Similarly, each of the conference participants include a communications interface coupled between communications medium 715 and the meeting manager processing logic (i.e. 720 and 324, respectively). The meeting manager software and the communications interface software in each of the conference participants is substantially the same logic. Thus, each conference participant includes the same conferencing capabilities as any other conferencing participant. The one exception to this rule is the assignment of an arbitrator participant.

The arbitrator participant status is assigned to one and only one conference participant at the initial start-up of a conference. The arbitrator status may be changed to a different participant at any time during a meeting. The arbitrator status may be transferred from one conference participant to another; however, only one conference participant in the conference may carry the arbitrator status at any one time. The arbitrator status is maintained by setting a state variable within the meeting manager of each conference participant. The state variable contains the identity of the assigned arbitrator participant. For example, referring to FIG. 7, conference participant 710 may be assigned as the arbitrator by setting variable 723 with the identity of conference participant 710. Similarly, the variable 727 in conference participant 712 is also set to the identity of conference participant 710. In this manner, the one and only one arbitrator participant is defined for all conference participants in the conference.

FIG. 7 illustrates a typical data conferencing configuration comprising a plurality of conference participants. In a typical conference scenario, two or more conference participants will initiate a conference or meeting by connecting to each other across communications medium 715. In the example of FIG. 7, conference participants 710 and 712 initially create a meeting (i.e. a connection) with each other across communications medium 715. As the meeting progresses, information is shared between participant 710 and participant 712 as controlled by meeting manager 720 and meeting manager 724 of each respective conference participant. The arbitrator participant, conference participant 710 in this example, is responsible for controlling access to the creation of meeting information (while each of the conference participants are responsible for dispersing their current and cumulative meeting information). As conference participants join the conference subsequent to the initiation of a meeting, arbitrator participant 710 is responsible for communicating with the meeting manger of the joining participant to merge the joining participant into the conference. The techniques for performing this merge and join operation are described in the above-referenced co-pending patent application.

Figure 8:
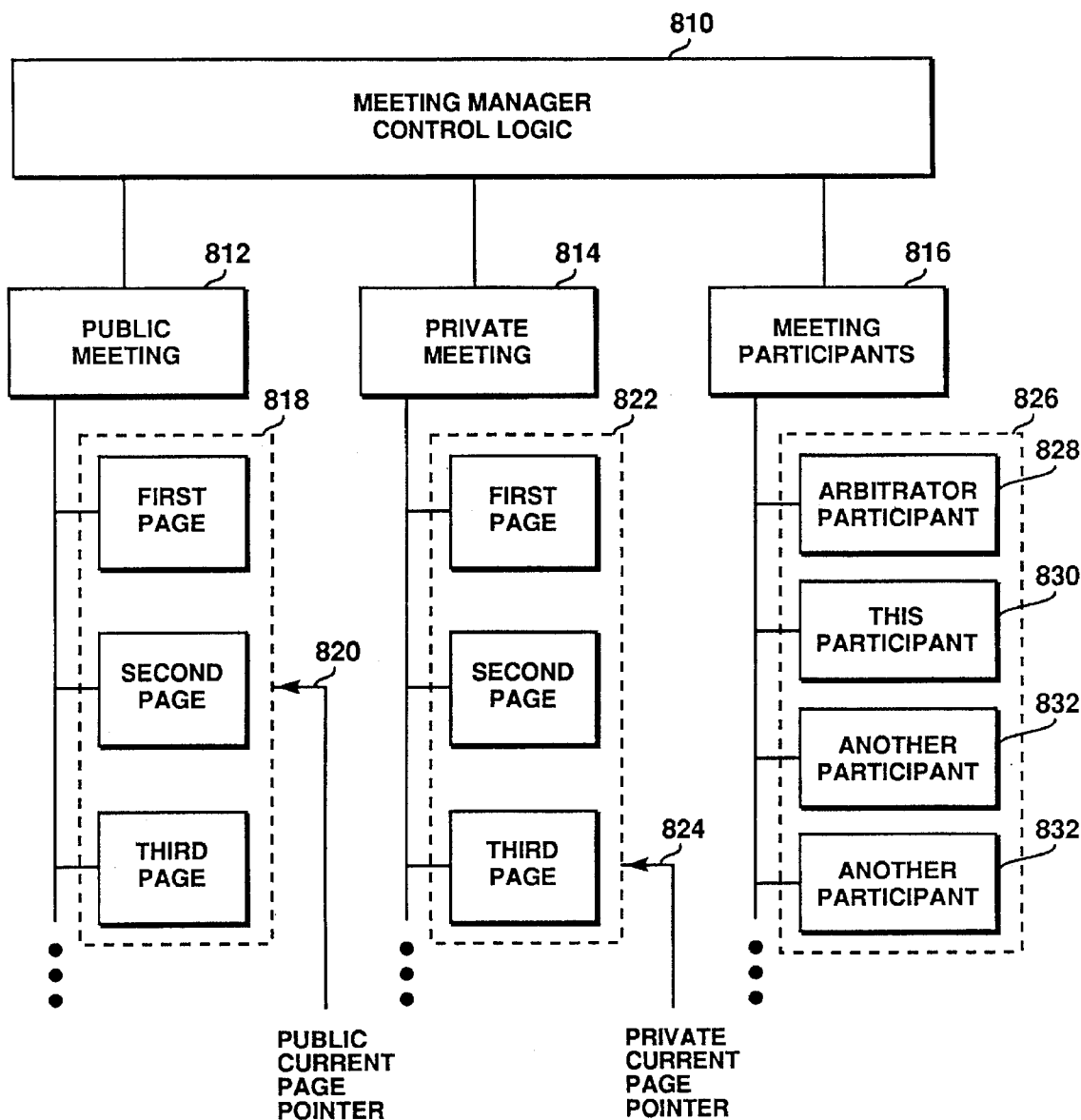
FIG. 8 illustrates several information components manipulated by the present invention.

Referring now to FIG. 8, three basic objects manipulated by meeting manager control logic 810 are illustrated. These basic components include public meeting information 812, private meeting information 814, and meeting participant information 816. The basic paradigm used in the present invention is a set of conference participants all sharing meeting information. This meeting information comprises multiple pages of drawing annotations, graphic annotations, or text annotations.

Figure 9:
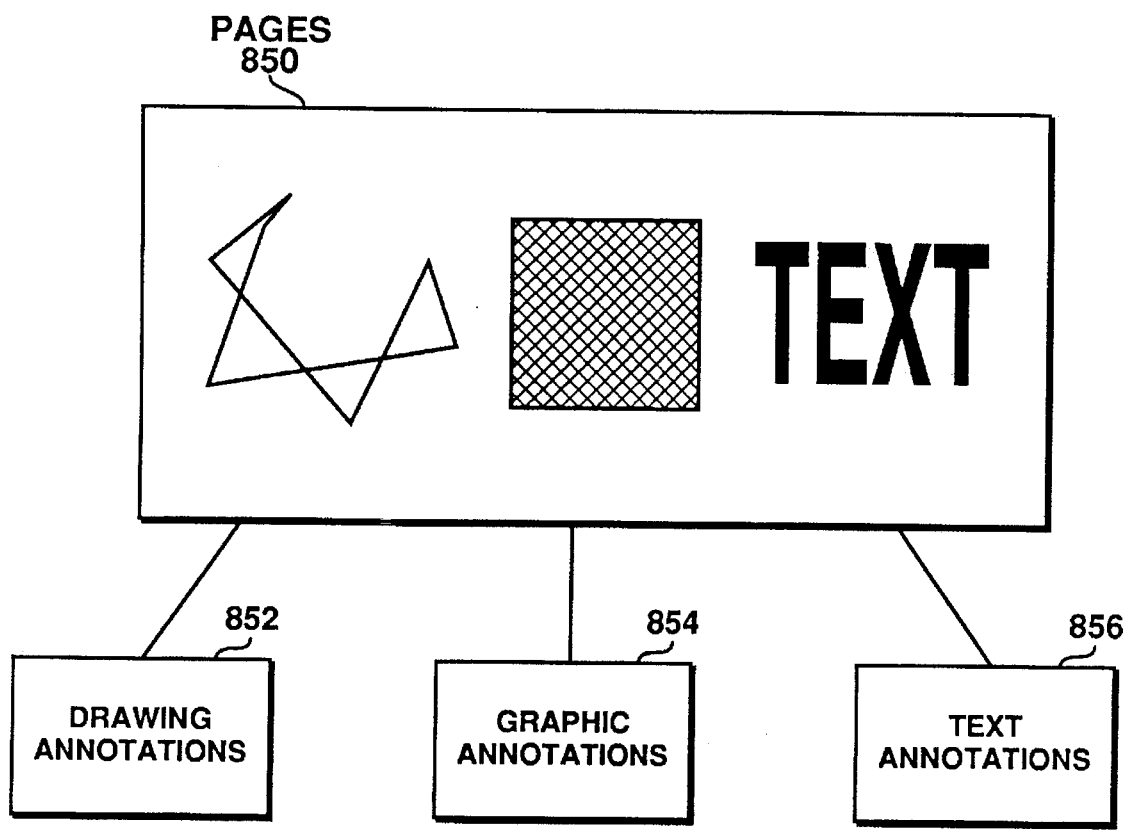
FIG. 9 illustrates the components of pages as manipulated in the present invention.

Referring to FIG. 9, the content of a page of meeting information in the present invention is illustrated. As shown, pages 850 include drawing annotations 852, which include graphic objects comprised of a plurality of graphic primitives such as line segments, arcs, polygons, or other drawing annotations created using typical drawing tools. Pages 850 also include graphic annotations 854 which typically comprise bit map graphics defined in terms of individual pixels or groups of pixels. Graphic annotations 854 may also include video data provided as part of a meeting page. Pages 850 also comprise text annotations 856 which comprise strings of text and control characters.

Referring again to FIG. 8, meetings in the present invention comprise a plurality of pages of information in the form of annotations. These pages are associated and linked together in a manner described in detail in reference to FIGS. 10–40 provided with the present application. As a meeting between conference participants progresses, pages of meeting information created in the form of annotations are created and added to the list of pages for the meeting. Upon completion of a meeting, these pages of information are retained on mass storage device 622 under a meeting file identifier. This meeting information may subsequently be recalled using this file identifier.

In the present invention, two page lists are maintained by the meeting manager 810 of each conference participant. A public meeting page list 818 and a private meeting page list 822 is maintained by each conference participant. The public meeting page list 818 is used for the storage public of pages that are shared among each of the conference participants. Any of the conference participants may view or manipulate the annotation information maintained in the public meeting page list 818. A public current page pointer 820 is used to identify the individual page of page list 818 that is currently being viewed by each of the conference participants. Private meeting page list 822 is used for storage of meeting information that is visible and manipulated only by the conference participant in which the private pages are resident (i.e., the local participant). In this manner, a conference participant may retain information in the private meeting page list 822 that is not visible or manipulated by other conference participants. As described in the subsequent sections of the present patent application, the present invention provides a means for linking the private pages of page list 822 with the public pages of page list 818. The present invention also provides a private current page pointer 824 used to identify the private page currently viewable by the local participant.

Referring now to FIGS. 10–22 and the flowcharts of FIGS. 23–40, a set of actions for linking and unlinking pages in the present invention is described. These actions include adding a page to a page list, changing the identity of the current page, deleting a page and reordering a page. In addition, the action of modifying the data or annotation on a page is described. Finally, the action of changing from a linked mode to a non-linked mode or from a non-linked mode to a linked mode is discussed.

Figure 23:
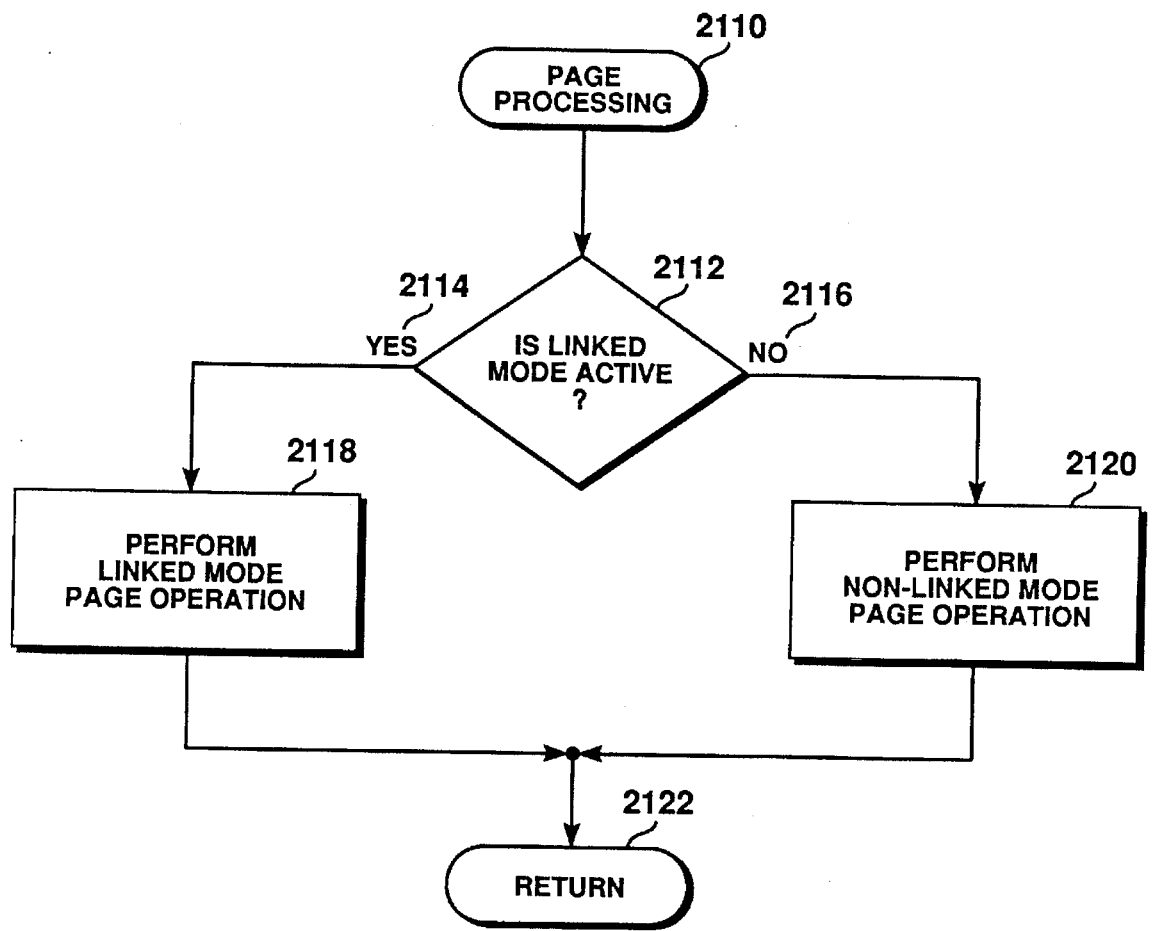
FIGS. 23–40 are flowcharts illustrating the processing logic of the present invention.

Referring now to FIG. 23, the page processing logic 2110 typically includes the initial decision block 2112. In this decision block, the link mode is queried. If a linked mode is active, processing path 2114 is taken to processing block 2118 where a linked mode page operation is performed. If a non-linked mode is active, processing path 2116 is taken to processing block 2120 where a non-linked mode page operation is performed. These linked mode page operations and non-linked mode page operations are described in detail in the figures and flowcharts that follow. Once the page operation is completed, page processing terminates through return bubble 2122 illustrated in FIG. 23.

Figure 10:
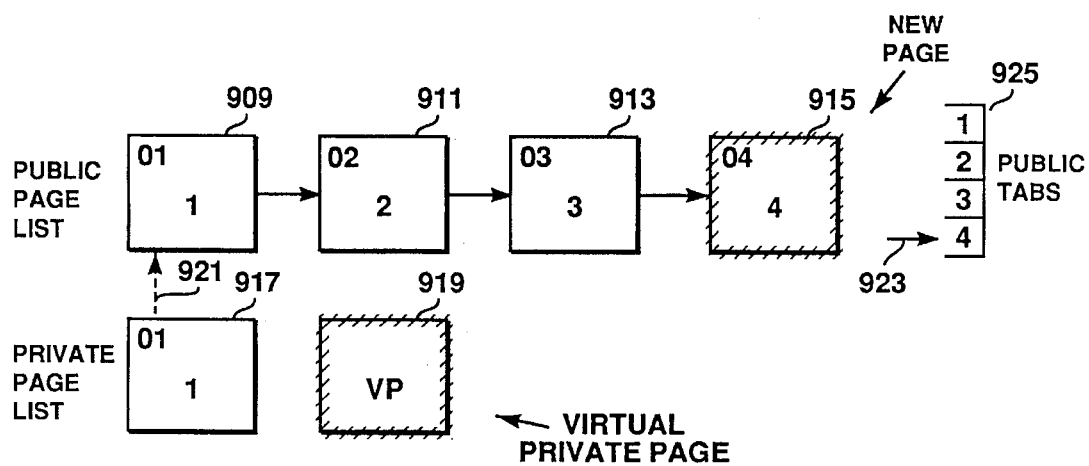
FIGS. 10–22 illustrate the manipulation of pointers and links between pages in the public and private page lists.
Figure 24:
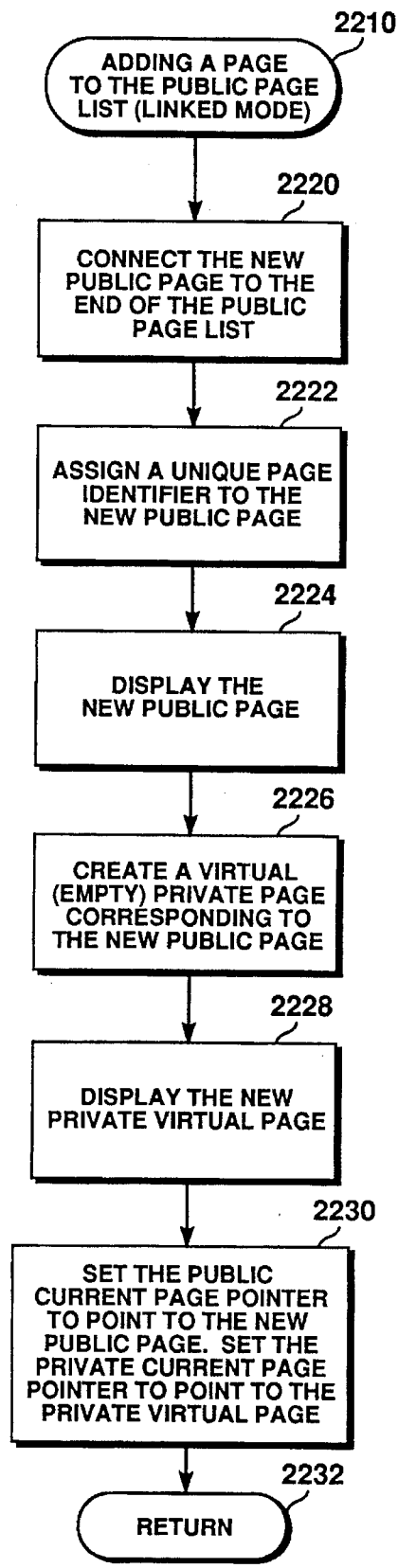

Referring now to FIG. 10 and FIG. 24, the processing logic for adding a page to the public page list in a linked mode is illustrated. Referring to FIG. 10, a public page list and a private page list are illustrated. Public page list comprises pages 909, 911, 913 and 915. The private page list is shown to comprise private page 917. For purposes of illustrating the principles of the present invention, the pages shown in FIGS. 10–22 in the present application comprise a page identifier in the upper left-hand corner of each page. The page identifier uniquely identifies each public page. Private pages can be linked to corresponding public pages using this page identifier. Private pages can also be non-linked in which case the page identifier is shown herein as undefined (i.e., xx). The contents of each page in the public page list and private page list can be any arbitrary drawing annotation, graphic annotation or text annotation. By way of example only, the contents of the pages illustrated in FIGS. 10–22 are shown as a numeric value in the center of each page. It will be apparent to one of ordinary skill in the art that these contents may be any arbitrary page annotation. As also shown in FIGS. 10–22, one page in the public page list and one page in the private page list or a virtual private page is shown as a box with a thick border. These pages are thus identified as the currently viewable page in either the application public workspace or the application private workspace. Pages in the public page list and the private page list are shown connected by arrows between the pages. These arrows represent data pointers for associating data items in a linked list. The use of a linked list in the computer programming art is well known to those of ordinary skill. In the detailed description hereafter, the use of the term "pointer" or "pointers" denotes a connection between individual pages of a page list. The use of the term "link" or "links" denotes a link between a public page and a private page.

Referring again to FIGS. 10 and 24, the processing logic for adding a page to the public page list in a linked mode is illustrated starting at bubble 2210 in FIG. 24. The first step in adding a page to the public page list in a linked mode is to connect the new public page to the end of the public page list using a pointer (processing block 2220). This newly connected page is shown by example in FIG. 10 as Page 915. A unique page identifier is assigned to the new public page in processing block 2222. The new public page is displayed in processing block 2224. Because a linked mode is active, a virtual (i.e. empty) private page is created in processing block 2226. The virtual private page is implicitly associated with the newly connected and currently displayed public page (processing block 2226). The new private virtual page is displayed in the application private workspace in processing block 2228. This virtual private page is illustrated in FIG. 10 as Page 919. The public current page pointer is set to point to the new public page in processing block 2230. In addition, the private current page pointer is set to point to the private virtual Page 919. The public current page pointer 923 is illustrated in FIG. 10 as pointing to Page 4 of the public page list. Page 4 of the public page list corresponds to Page 915 illustrated in FIG. 10. Processing of the present invention for adding a page to the public page list in a linked mode then terminates through return bubble 2232 in FIG. 24.

Figure 11:
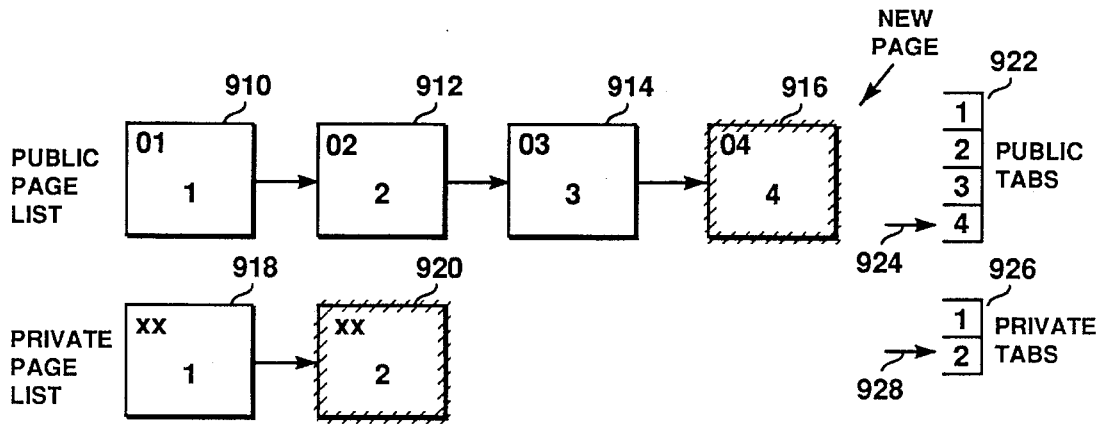
Figure 25:
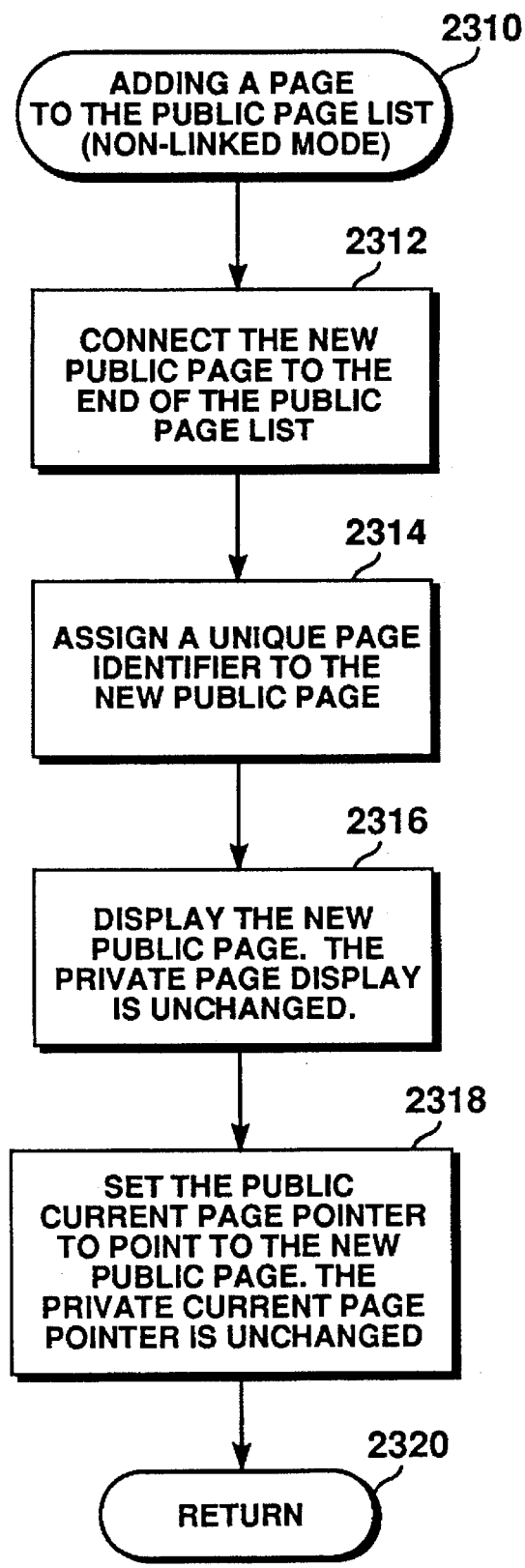

Referring now to FIG. 25, the processing logic for adding a page to the public page list in a non-linked mode is illustrated starting at bubble 2320. The corresponding page lists for an example of this operation are illustrated in FIG. 11. In a manner similar to the processing performed for adding a page to the public page list in a linked mode, the first steps in the non-linked mode case is to connect the new public page to the end of the public page list using a pointer (processing block 2312) and to assign a unique page identifier to the new public page (processing block 2314). The new public page is displayed in processing block 2316. The private page display is unchanged by this operation. As shown in FIG. 11, new public page 916 is connected to the end of the public page list using a pointer. The private page list in the example of FIG. 11 comprising private pages 918 and 920 remains unchanged. Private Page 920 continues to be displayed in the application private workspace. Because private Pages 918 and 920 are not linked to a corresponding public page, the page identifier, illustrated in FIG. 11 as the lowercase xx in the upper left hand corner of each page, is undefined. The public current page pointer is set to point to the new public page in processing block 2318 illustrated in FIG. 25. The private current page pointer is unchanged by this operation. Processing for adding a page to the public page list in a non-linked mode then terminates through return bubble 2320.

Figure 12:
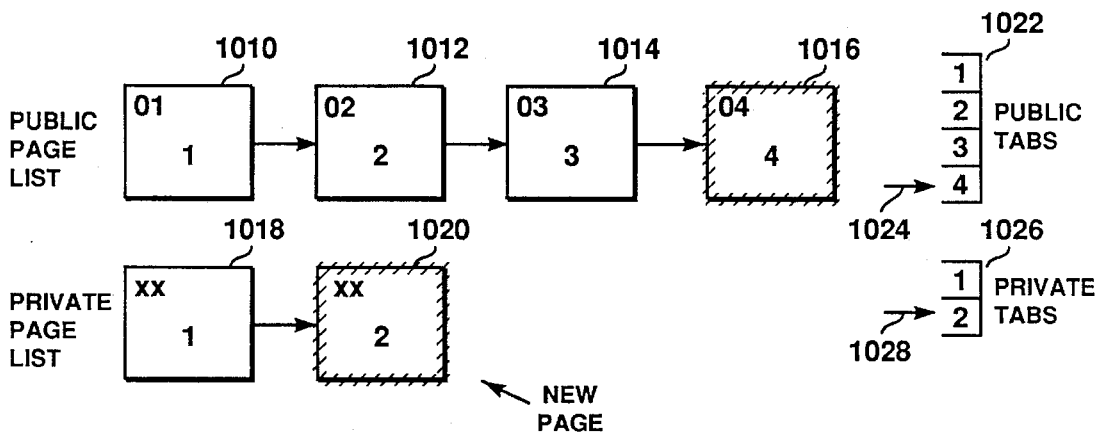
Figure 26:
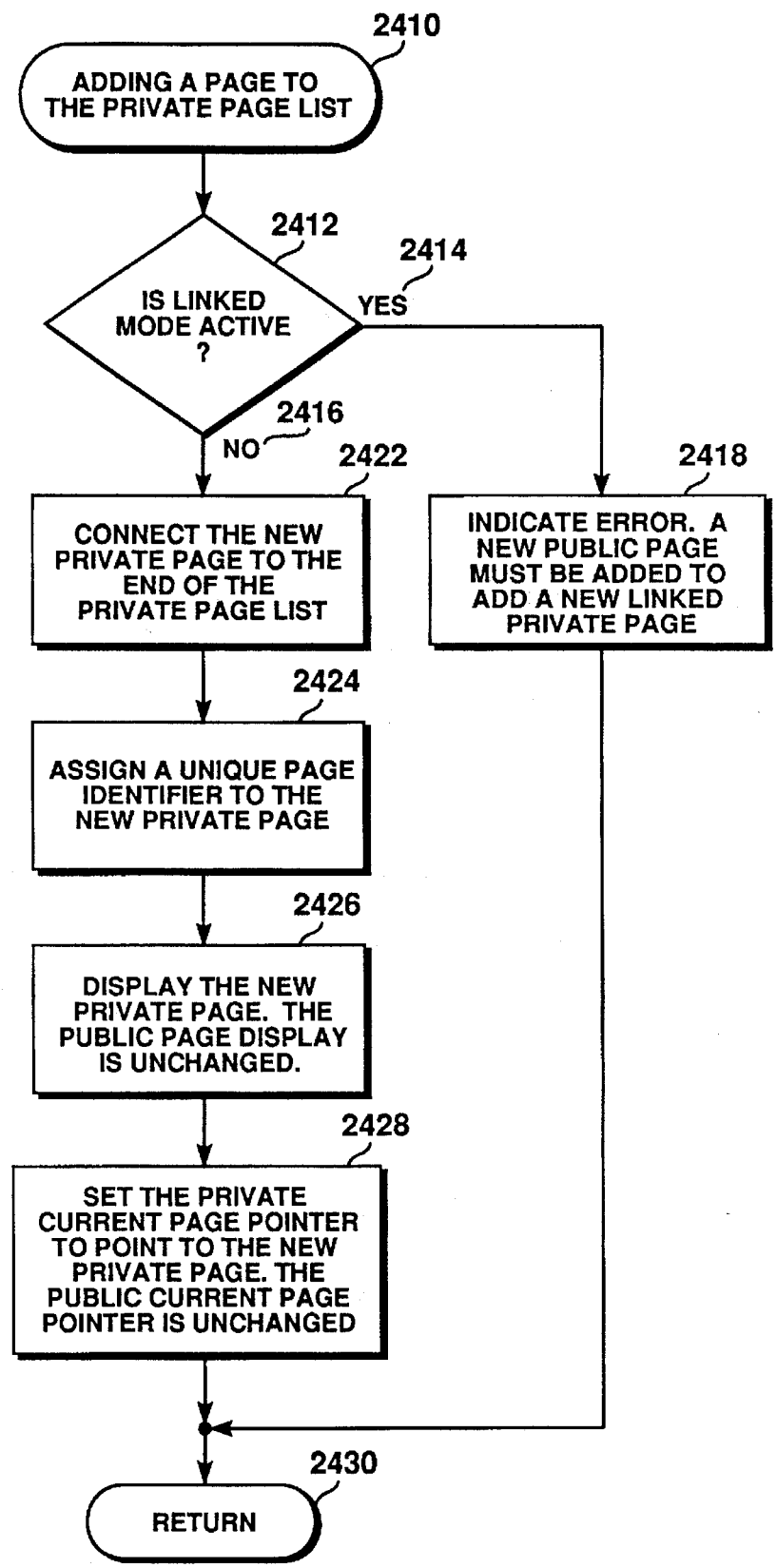

Referring now to FIG. 26, the processing logic for adding a page to the private page list is illustrated starting at bubble 2410. A corresponding example of this operation is illustrated in FIG. 12. If the operation to add a private page to the private page list is activated in a linked mode, processing path 2414 is taken to processing block 2418. In this case, an error indication is encountered. In the present invention, a new public page must be added in order to add a new linked private page. This error condition is indicated in processing block 2418 and control returns through bubble 2430.

If a linked mode is not active, processing path 2416 is taken to processing block 2422. In this case, the new private page is connected to the end of the private page list. This page is indicated in FIG. 12 as new private page 1020. A unique page identifier is assigned to the new private page in processing block 2424. The new private page is displayed in processing block 2426. The public page list and public page display are not changed in this process. As illustrated in FIG. 12, new private page 1020 is displayed as a result of the execution of processing block 2426. In processing block 2428, the private current page pointer is set to point to the new private page. The public current page pointer remains unchanged. As indicated in FIG. 12, the private current page pointer 1028 now points to private page 2 which corresponds to private page 1020 of the private page list. Processing for adding a page to the private page list illustrated in FIG. 26 then terminates through return bubble 2430.

Figure 13:
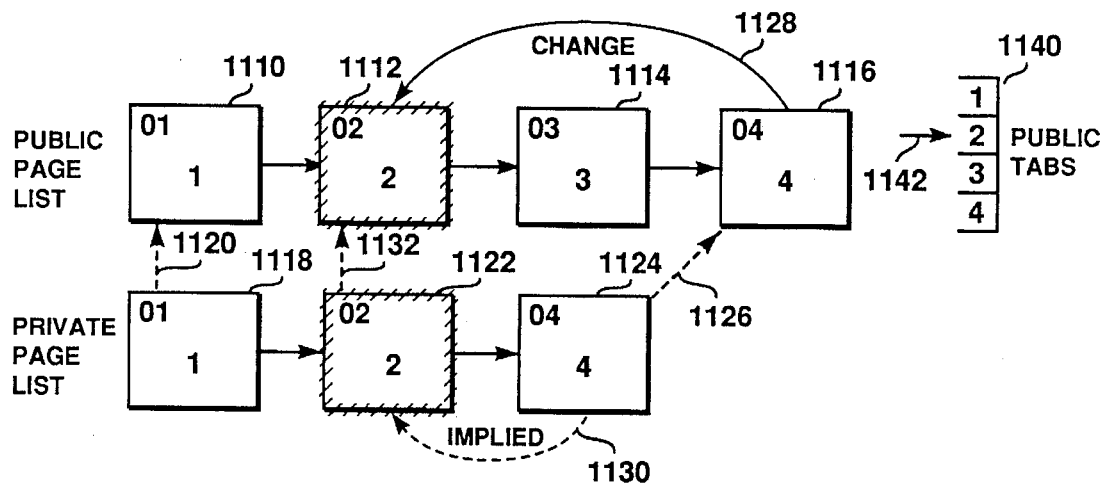
Figure 27:
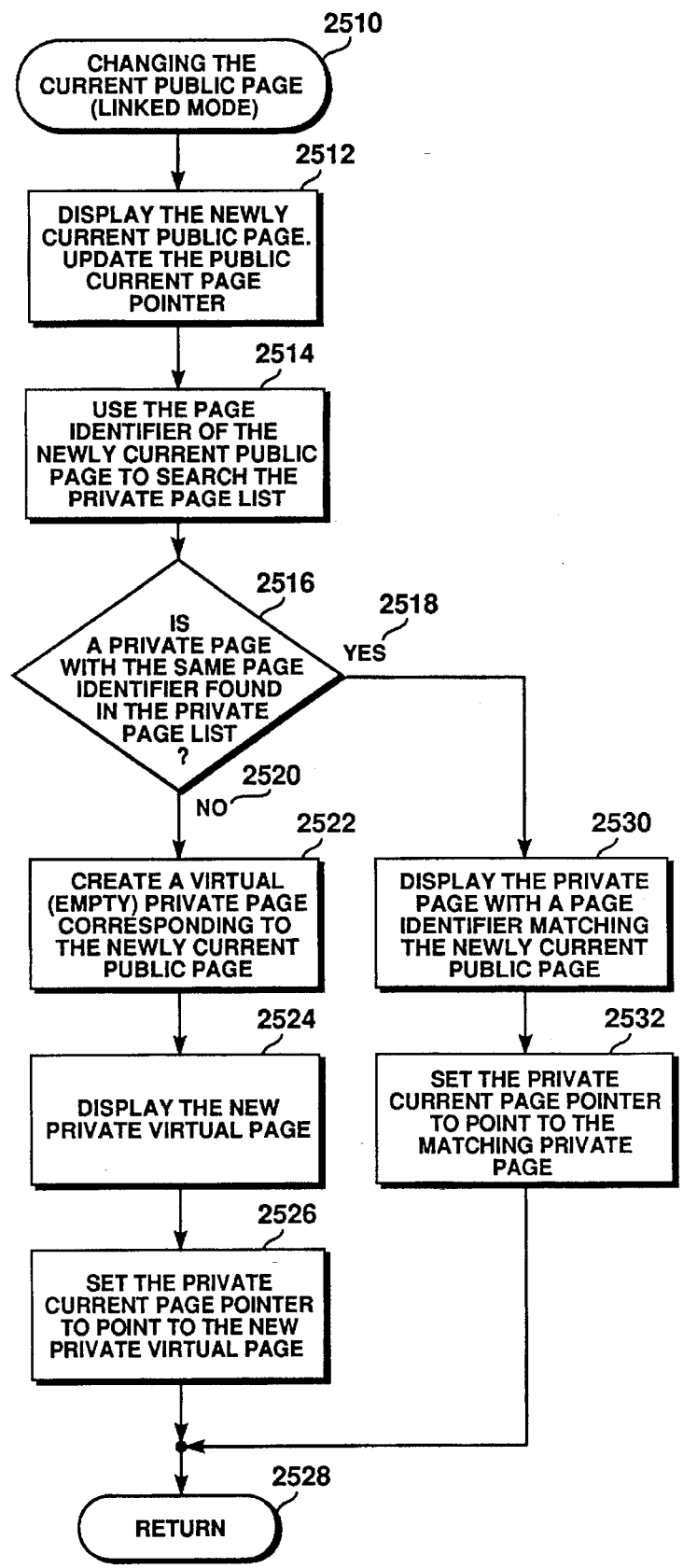

Referring now to FIGS. 27 and 13, the processing logic of the present invention for changing the current public page in a linked mode is illustrated starting at bubble 2510. The current page in the present invention is the page currently being displayed in a workspace area. There is a current public page displayed in the application public workspace. There is also a current private page currently displayed in the application private workspace. The operation of changing the current page results in a new page being displayed in the application public workspace. In addition, in a linked mode, an implied change occurs to the page displayed in the application private workspace. As is illustrated in FIG. 27, the first step in changing the current public page in a linked mode is to display the newly current public page in the application public workspace (processing block 2512). The public current page pointer is updated to point to the new current public page. This process is illustrated in FIG. 13. In FIG. 13, the current public page was changed from public page 1116 to public page 1112 as indicated by line 1128. Thus, public page 1112 is now the public page currently displayed in the application public workspace as indicated by the thick border of the box representing page 1112 in FIG. 13. In FIG. 13, the public current page pointer 1142 is shown as updated to point to the second public page corresponding to public page 1112. Referring again to FIG. 27, the page identifier of the newly current public page is used to search the private page list in processing block 2514. If a private page in the private page list has a page identifier that matches a newly current public page identifier, processing path 2518 is taken to processing block 2530. In this case, the matching private page is linked to the newly current public page as indicated by line 2232 in FIG. 13. The matching (i.e. linked) private page is displayed in the application private workspace in processing block 2530. The private current page pointer is updated to point to the newly current private page in processing block 2532. Processing control for changing the current public page then terminates through the return bubble 2528 in FIG. 27.

Figure 14:
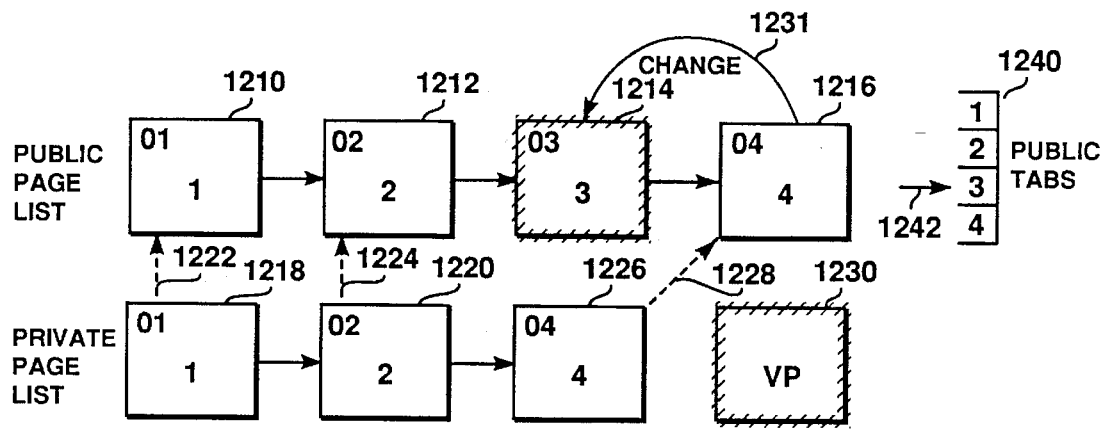

Referring still to FIG. 27, processing path 2520 is taken if a linked private page corresponding to the newly current public page is not found in the private page list. In this case, a virtual (empty) private page corresponding to the newly current public page is created in processing block 2522. This virtual page is shown as virtual page 1230 illustrated in FIG. 14. FIG. 14 illustrates an example of changing the currently public page in a linked mode when a linked private page is not present in the private page list. In this case, the current public page was changed from public page 1216 to newly current public page 1214 as indicated by line 1231. Because newly current public page 1214 is not linked with a corresponding page in the private page list, no linked private page was found in the private page list. Thus, processing path 2520 illustrated in FIG. 27 was taken and virtual page 1230 was created in processing block 2522. The new private virtual page 1230 is displayed in processing block 2524. The new private virtual page remains a virtual page until data or some form of annotation is added to the page. At that point, virtual page 1230 will be connected to with the private page list. The private current page pointer is set to point to the new private virtual page in processing block 2526. Processing for changing the current public page in a linked mode then terminates through return bubble 2528 illustrated in FIG. 27.

Figure 15:
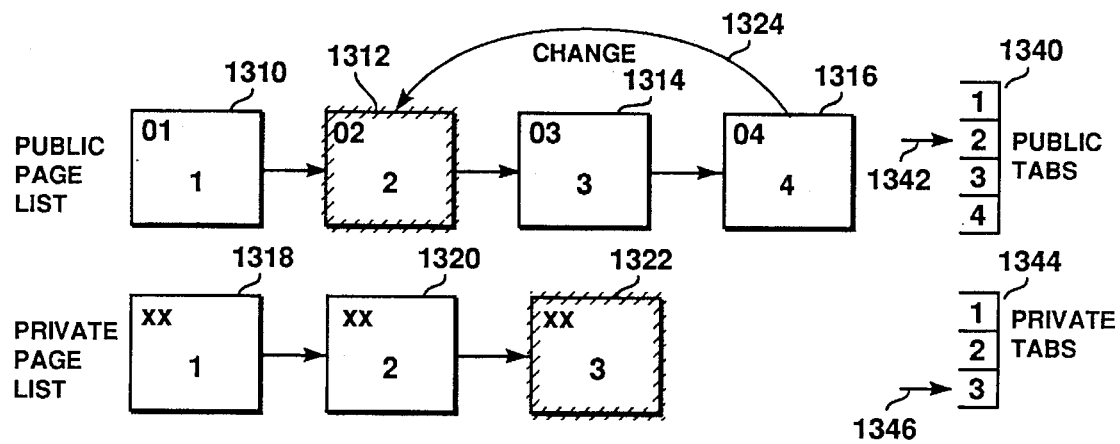
Figure 28:
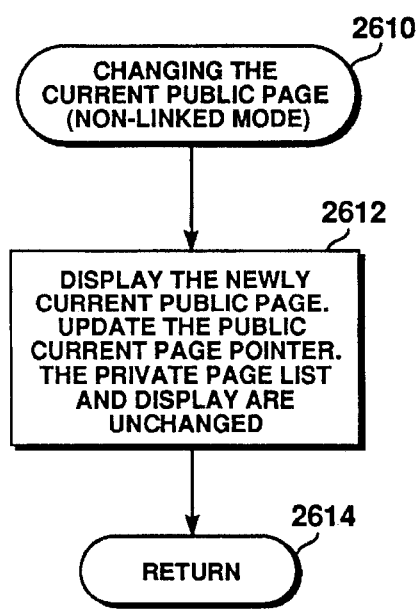

Referring now to FIG. 28, the processing logic for changing the current public page in a non-linked mode is illustrated starting at bubble 2610. In this case, the newly current public page is displayed in processing block 2612. This process is illustrated in FIG. 15. Referring to FIG. 15, the current public page was changed from public page 1316 to public page 1312 as indicated by line 1324. In this example, public page 1312 is the newly current public and is displayed in the application public workspace. The public current page pointer 1342 is updated to point to the newly current public page in processing block 2612. Because a non-linked mode is active, no private pages of the private page list are linked to corresponding public pages in the public page list. Thus, the private page list and display are unchanged as a result of changing the current public page in a non-linked mode. Processing then terminates through return bubble 2614.

Figure 16:
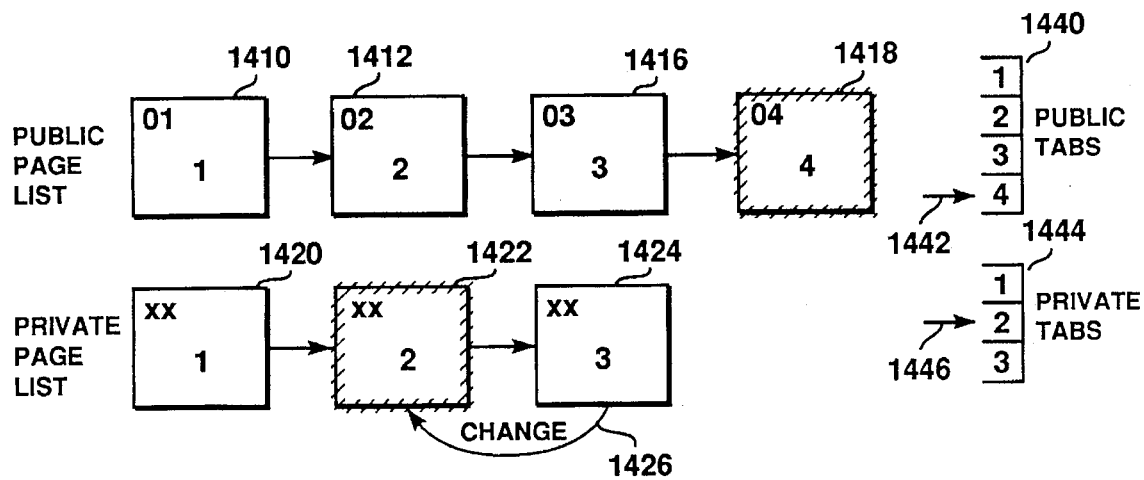
Figure 29:
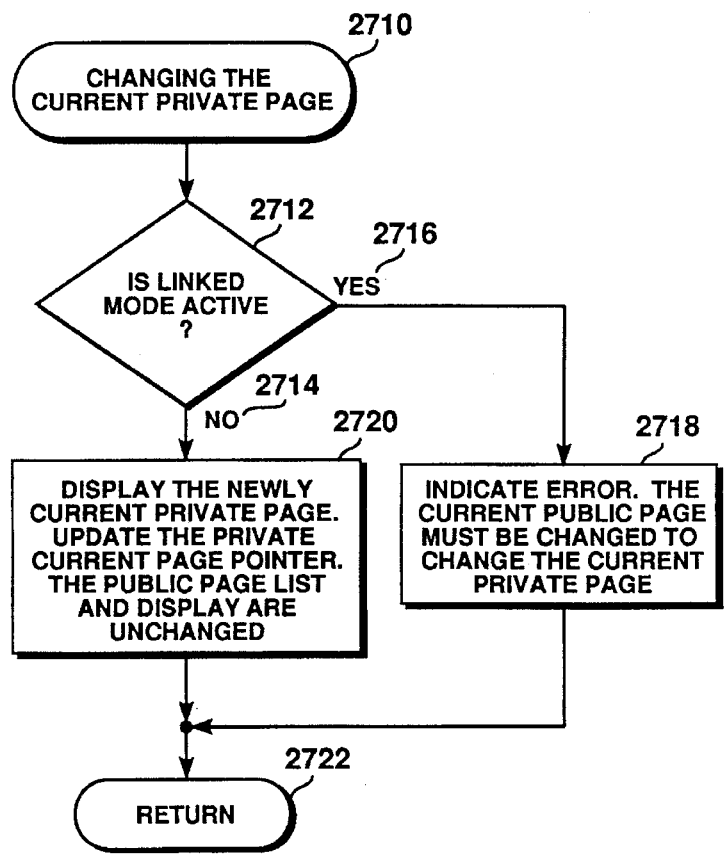

Referring now to FIG. 29, the processing logic for changing the current private page is illustrated. If this operation is invoked in a linked mode, processing path 2716 is taken and an error condition is indicated (processing block 2718). In the present invention, the current public page must be changed to cause a corresponding change to the current private page. The linked private page cannot be changed directly. If a non-linked mode is active, processing path 2714 is taken to processing block 2720. In this case, the newly current private page is displayed and the private current page pointer is updated to point to the newly current private page. This process is illustrated in FIG. 16. Referring to FIG. 16, the current private page is changed from private page 1424 to private page 1422 as indicated by line 1426. Private page 1422 is now the current private page and is displayed in the application private workspace. Because a non-linked mode is active, the public page list and display are unchanged. The private current page pointer 1446 is updated to point to the newly current private page. Processing for changing the current private page then terminates through return bubble 2722 illustrated in FIG. 29.

Figure 17:
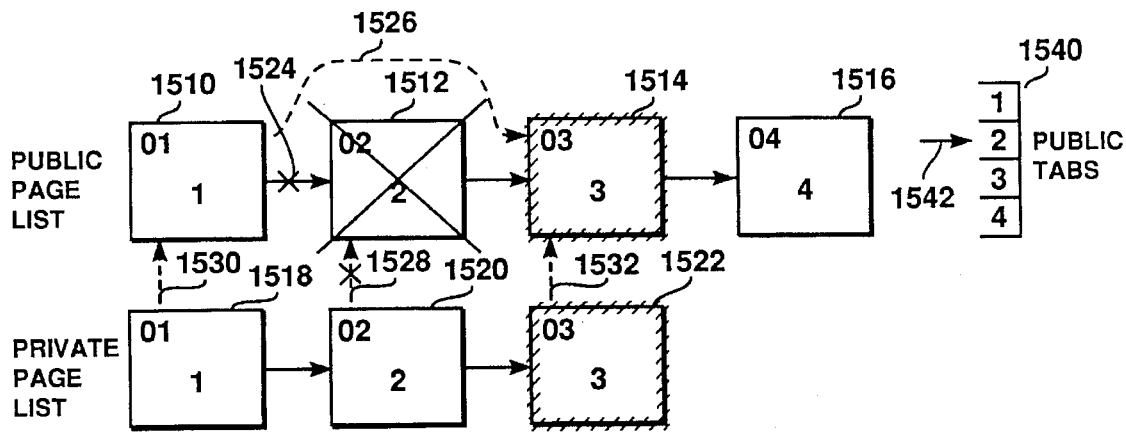
Figure 18:
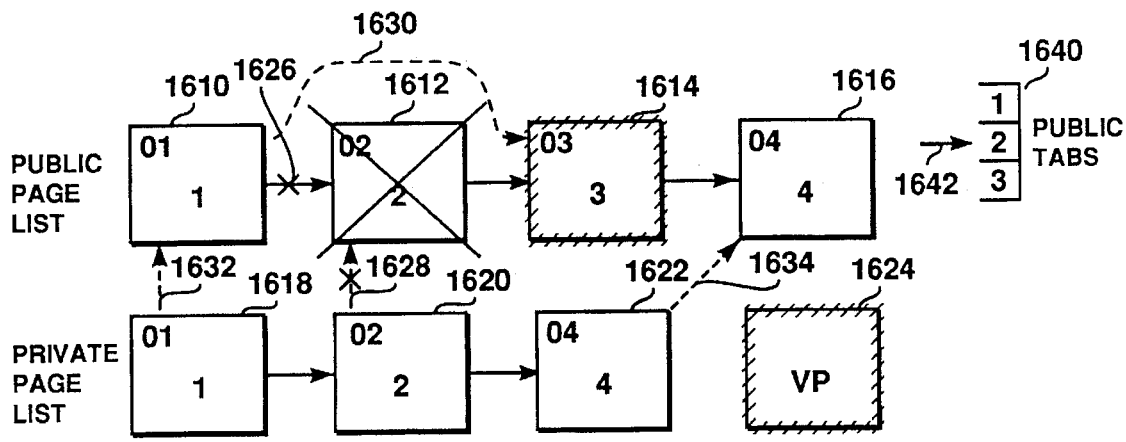
Figure 30:
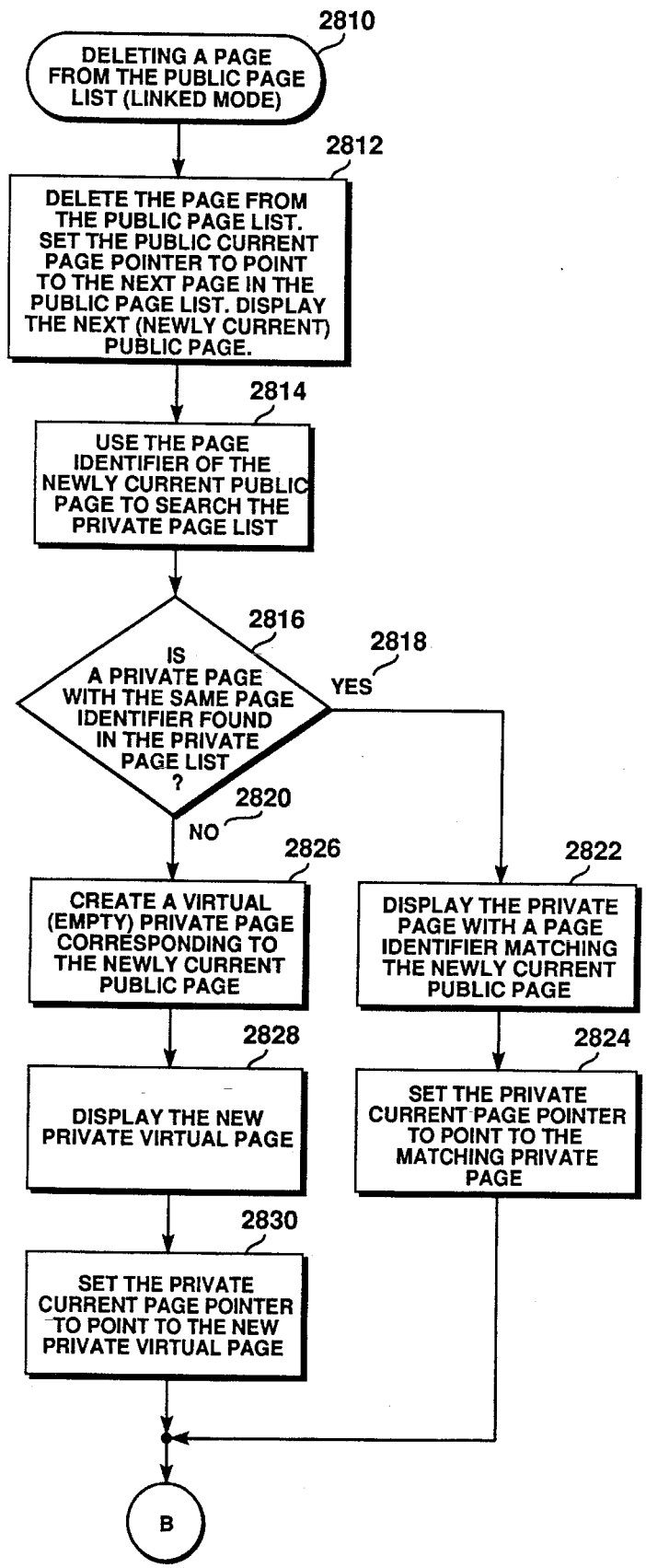

Referring now to FIG. 30, the processing logic for deleting a page from the public page list in a linked mode is illustrated starting at bubble 2810. An example of the operation of this logic is illustrated in FIGS. 17 and 18. Referring now to FIG. 30, the first operation in deleting a public page in linked mode is to remove the public page from the public page list. In the example illustrated in FIG. 17, public page 1512 is being deleted from the public page list. As part of this process, the pointer 1524 from public page 1510 to public page 1512 must be removed. A pointer 1526 must be connected from public page 1510 to public page 1514. The rearrangement of pointers effectively deletes public page 1512 from the public page list. The public current page pointer 1542 is set to point to the next page in the public page list. The newly current public page (i.e. public page 1514) is displayed in the application public workspace (processing block 2812). Because the newly current public page may be linked with a corresponding private page, it is necessary to search the private page list for a linked private page. In processing block 2814, the page identifier of the newly current public page is used to search the private page list. If a private page list is found in the private page list with the same identifier as the newly current public page, processing path 2818 is taken to processing block 2822. In this case, a private page is linked with the newly current public page. The linked private page is displayed in the application private workspace in processing block 2822. The private current page pointer is set to point to the linked and newly displayed private page in processing block 2824. Processing for deleting a public page in linked mode continues at the bubble labeled B illustrated in FIG. 31.

Referring still to FIG. 30, processing path 2820 is taken if a linked private page is not found in the private page list.

An example of this case is illustrated in FIG. 18. As shown in FIG. 18, the newly current public page 1614 is not linked with a corresponding private page. Thus, a virtual (empty) private page 1624 is created in processing block 2826. The new private virtual page is displayed in the application private workspace in processing block 2828. The private current page pointer is set to point to the new private virtual page in processing block 2830. Processing for deleting a public page in linked mode continues at the bubble labeled B illustrated in FIG. 1.

Figure 31:
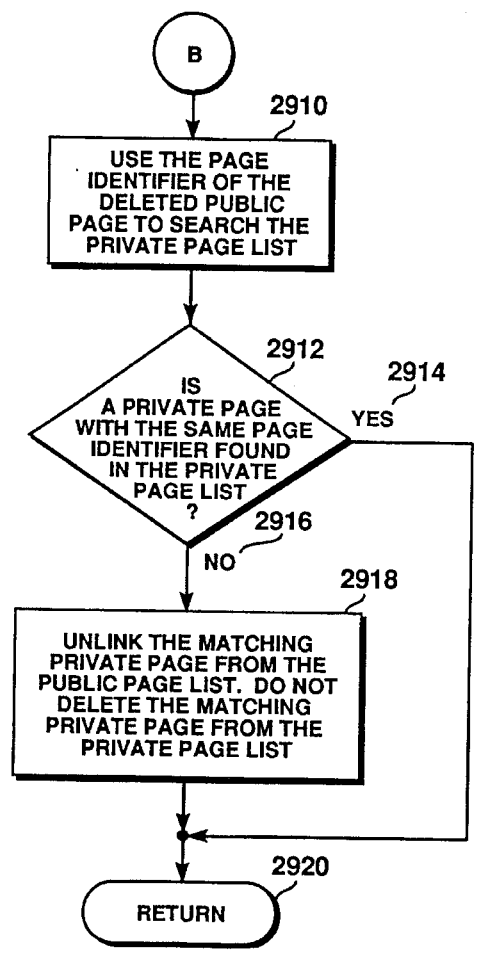

Referring now to FIG. 31, processing for deleting a public page in linked mode continues at the bubble labeled B. The page identifier of the deleted public page is used to search the private page list (processing block 2910). If a private page with the same page identifier as the deleted public page is found in the private page list, processing path 2916 is taken to processing block 2918. In this case, the matching private page is unlinked from the deleted public page. The unlinking of the private page corresponds to the removal of link 1628 illustrated in FIG. 18. Even though the public page 1612 to which private page 1620 was linked is deleted, the previously linked private page is not removed from the private page list. In this manner, deletion of a public page does not affect the private pages created by a particular conference participant. Processing for the deletion of a public page in a linked mode then terminates through the return bubble 2920 illustrated in FIG. 31.

Figure 19:
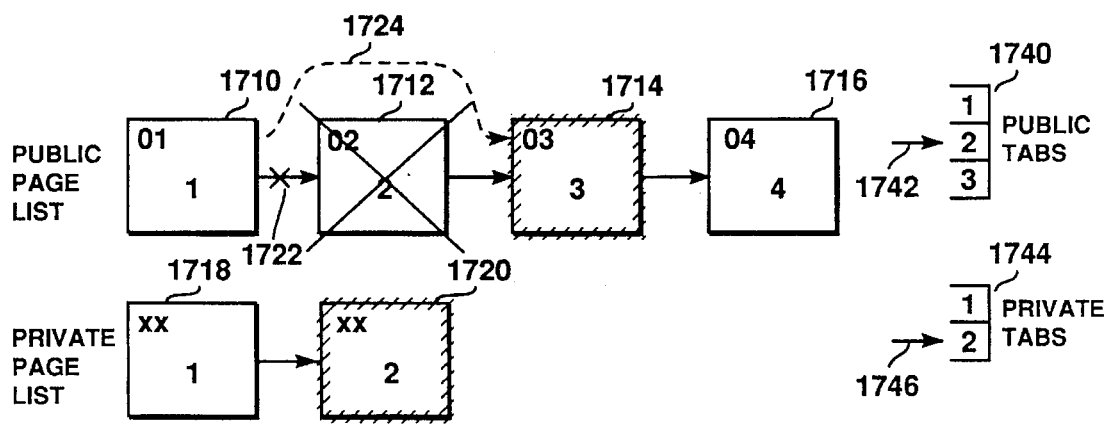
Figure 32:
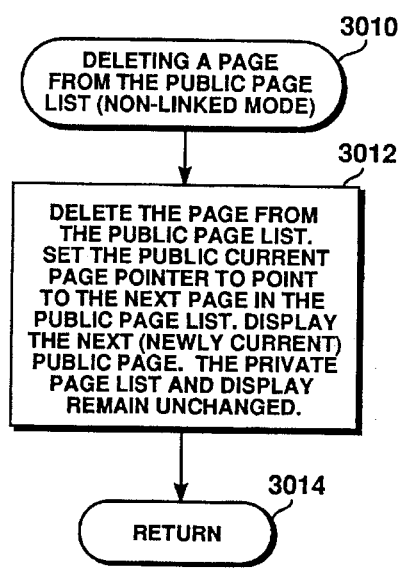

Referring now to FIG. 32, the processing logic of the present invention for deleting a page from the public page list in a non-linked mode is illustrated. A corresponding example illustrating the operation of this processing logic is illustrated in FIG. 19. The public page is deleted from the public page list in processing block 3012. This step, as illustrated in FIG. 19, involves removing the pointer 1722 between public page 1710 and deleted public page 1712. A new pointer 1724 is assigned between public page 17 10 and public page 1714. These operations effectively delete public page 1712 from the public page list. The public current page pointer 1742 is set to point to the next page in the public page list. This newly current public page is displayed in processing block 3012. In the example of FIG. 19, the newly current public page 1714 is displayed. Because the non-linked mode is active, the private page list and the application private workspace remains unchanged. Processing for deleting a page from the public page list in non-linked mode then terminates through the return bubble 3014 illustrated in FIG. 32.

Figure 20:
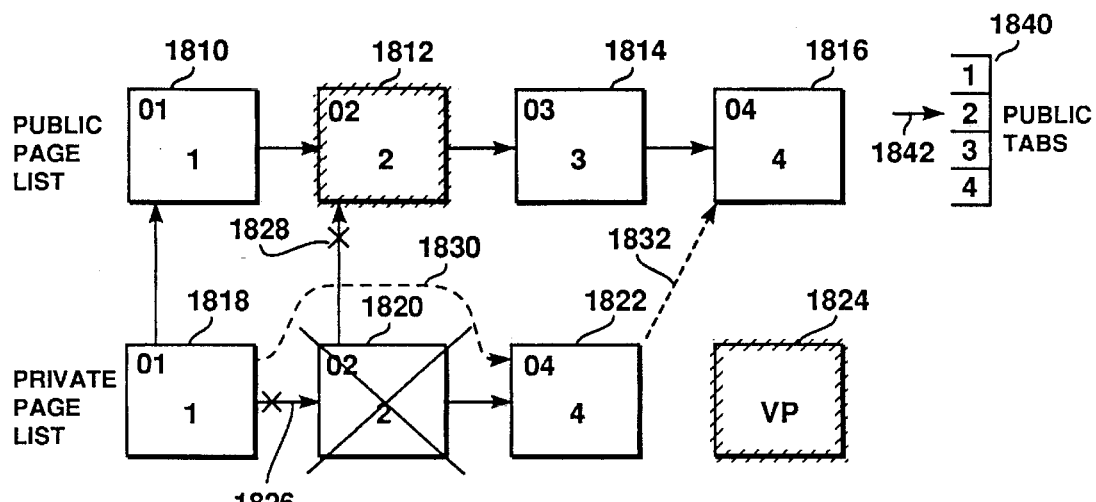
Figure 33:
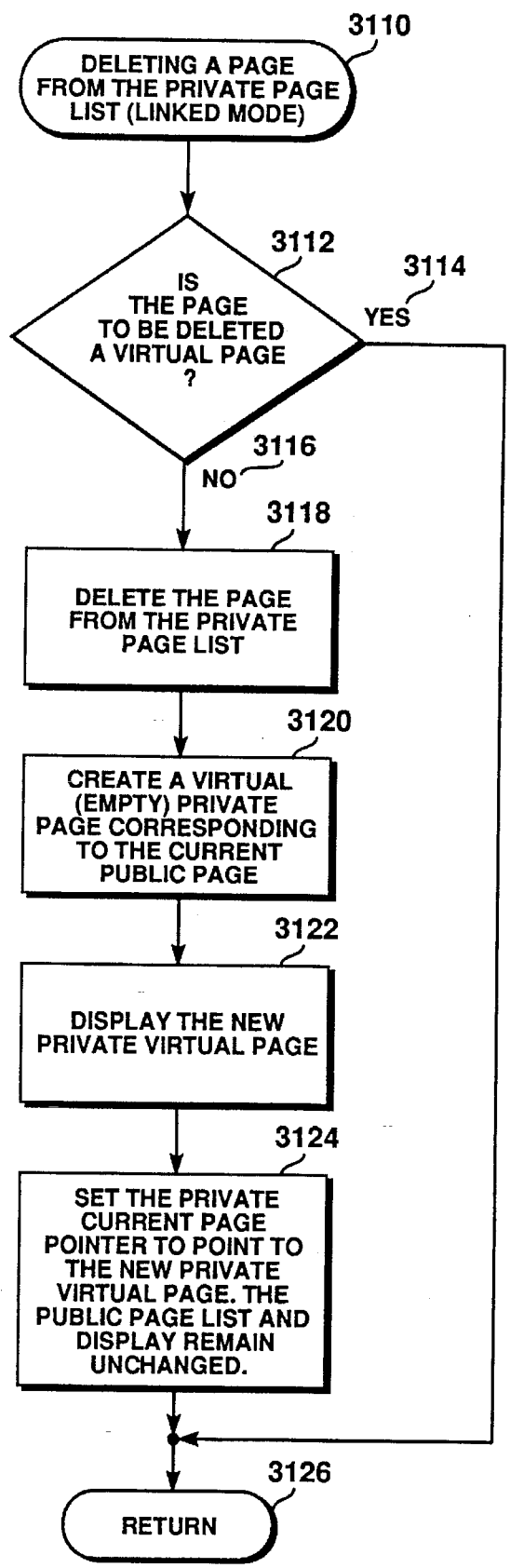

Referring now to FIG. 33, the processing logic for deleting a page from the private page list in a linked mode is illustrated. A corresponding example illustrating the operation of this processing logic is illustrated in FIG. 20. If the private page to be deleted is a virtual page, processing path 3114 is taken to the return bubble 3126 where processing for this operation terminates with no further action. Because a virtual private page is not connected to the private page list, no decoupling of the virtual page from the private page list is required. If, however, the page to be deleted is not a virtual page, processing path 3116 is taken to processing block 3118 where the page is deleted from the private page list. The operation of this step is illustrated in FIG. 20. The pointer 1826 between private page 1818 and deleted page 1820 is removed. A new pointer 1830 between private page 1818 and private page 1822 is connected. These steps effectively remove private page 1820 from the private page list (processing block 3118). The deletion of private page 1820 also unlinks private page 1820 from a corresponding public page. In the example of FIG. 20, private page 1820 is unlinked from public page 1812 by the removal of link 1828. Because the linked mode is active and the linked private page has been deleted, a virtual private page corresponding to the current public page is created in processing block 3120. This virtual page 1824 is illustrated in FIG. 20. The new private virtual page 1824 is displayed in the application private workspace in processing block 3122. The private current page pointer is set to point to the new private virtual page 1824. The public page list and the application public workspace display remain unchanged (processing block 3124). Processing for deleting a page from the private page list in linked mode then terminates through return bubble 3126 illustrated in FIG. 33.

Figure 21:
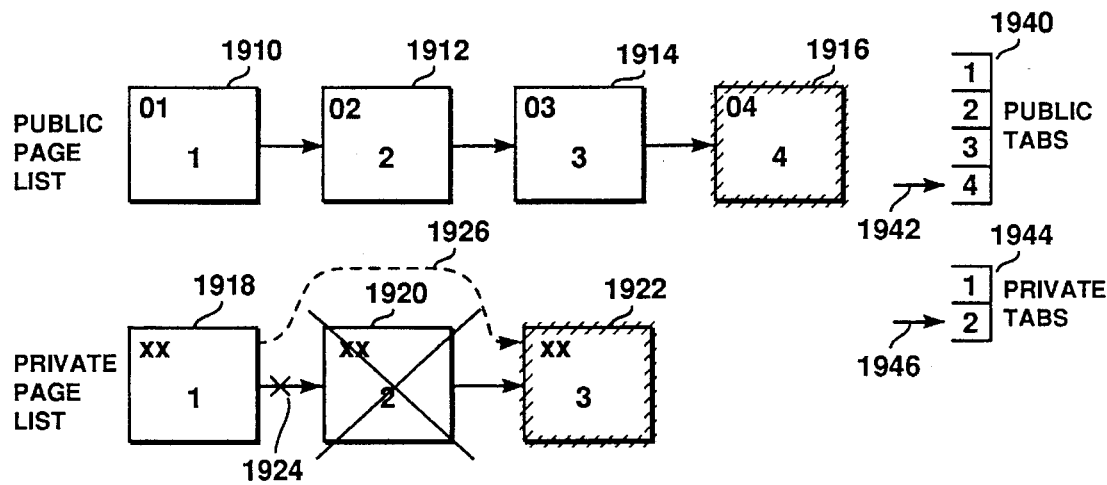
Figure 34:
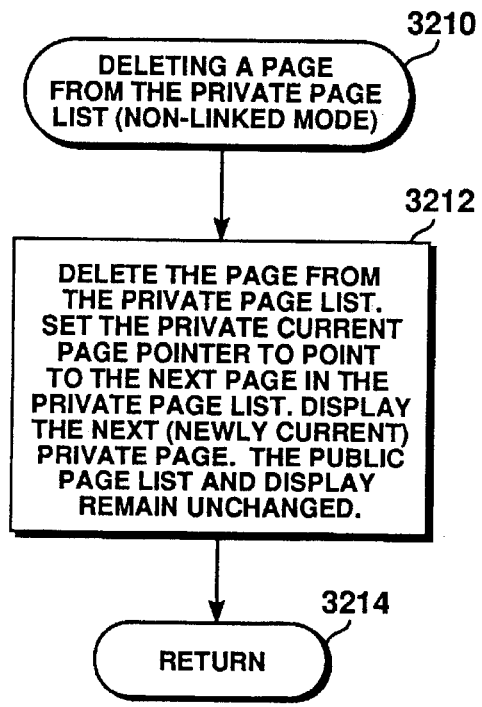

Referring now to FIG. 34, the processing logic for deleting a page from the private page list in a non-linked mode is illustrated. A corresponding example illustrating the operation of this processing logic is illustrated in FIG. 21. In processing block 3212, the private page is deleted from the private page list. Referring to FIG. 21, the step of deleting the page from the private page list comprises removing pointer 1924 between private page 1918 and deleted page 1920. A new pointer 1926 is assigned between private page 1918 and the newly current private page 1922. The private current page pointer is set to point to the next current page in the private page list. In the example illustrated in FIG. 21, the next page in the private page list is private page 1922. This newly current private page is displayed in processing block 3212. Because the non-linked mode is active, the public page list and the application public workspace remains unchanged. Processing for this function terminates through the return bubble 3214 illustrated in FIG. 34.

Figure 35:
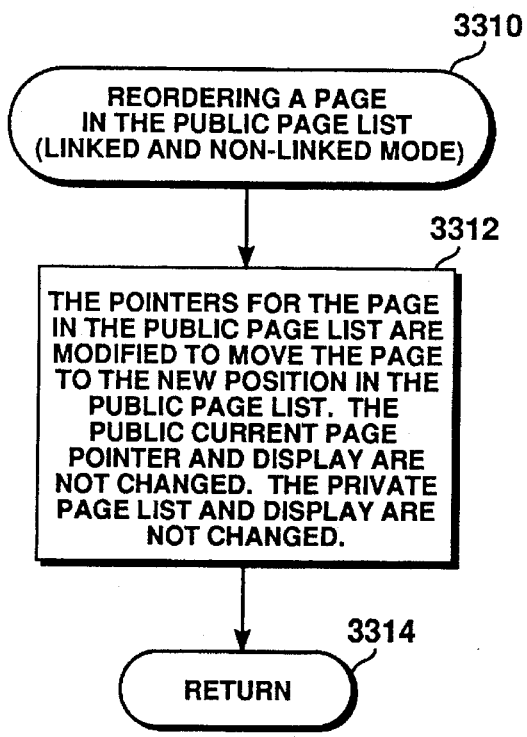

Referring now to FIG. 35, the processing logic for reordering a page in the public page list in both a linked and non-linked mode is illustrated. In this function, the page list pointers for the specified page in the public page list are modified to move the page to a new position in the public page list. The public current page pointer and display are not changed. Similarly, the private page list and display are not changed (processing block 3312). The function terminates through return bubble 3314.

Figure 36:
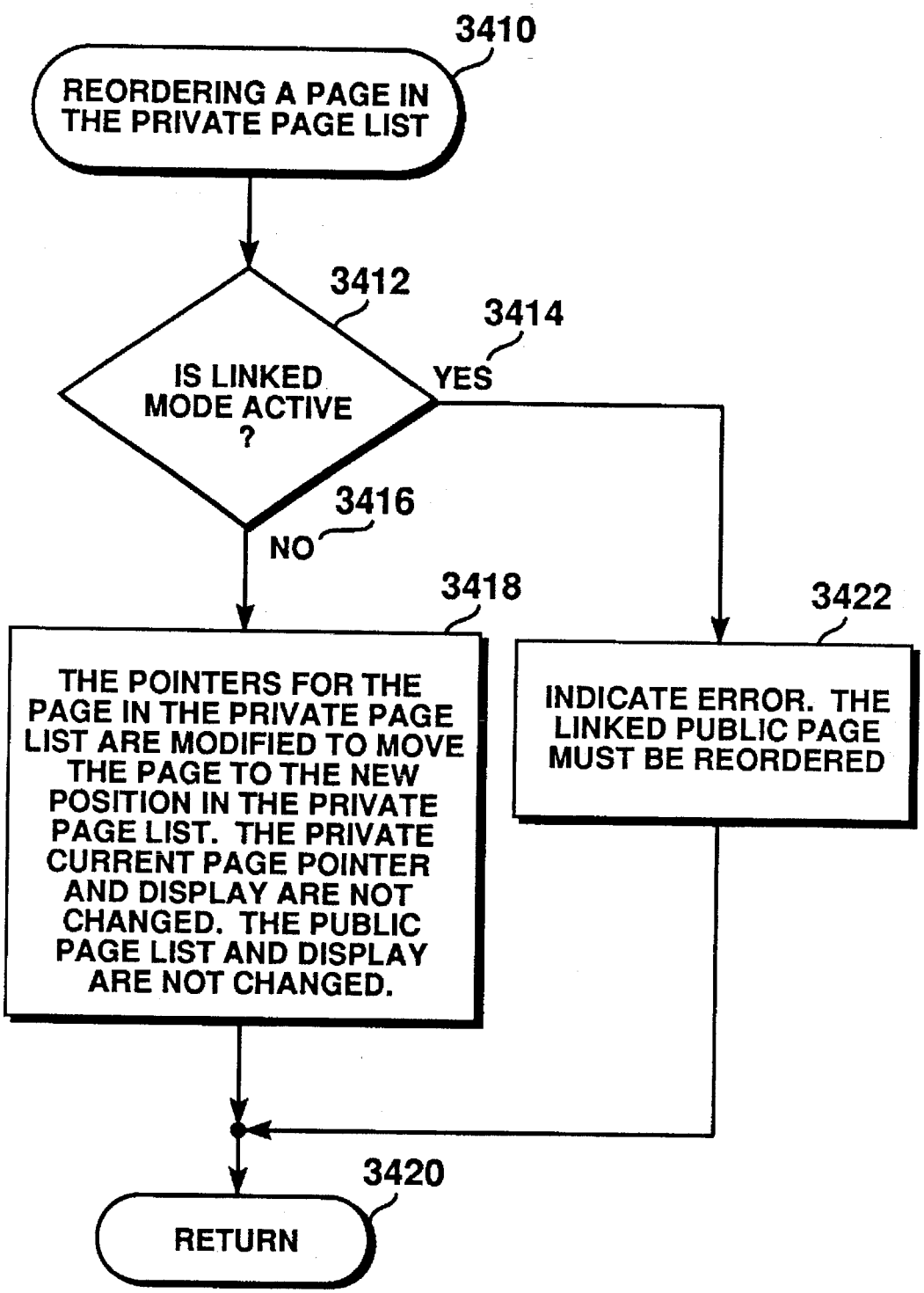

Referring now to FIG. 36, the processing logic for reordering a page in the private page list is illustrated. If the linked mode is active, an error condition is indicated. By virtue of the implementation, this case will never occur. The user is prevented from requesting a reordering of the private page list if the linked mode is active. In the present invention, a linked private page cannot be reordered directly. Instead, the linked public page must be reordered (processing block 3422). If a non-linked mode is active, processing path 3416 is taken to processing block 3418. In this case, the page list pointers for the specified page in the private page list are modified to move the page to the new position in the private page list. The private current page pointer and the application private workspace are not changed. Similarly, the public page list and the application public workspace are not modified (processing block 3418). Processing for this function then terminates through return bubble 3420.

Figure 22:
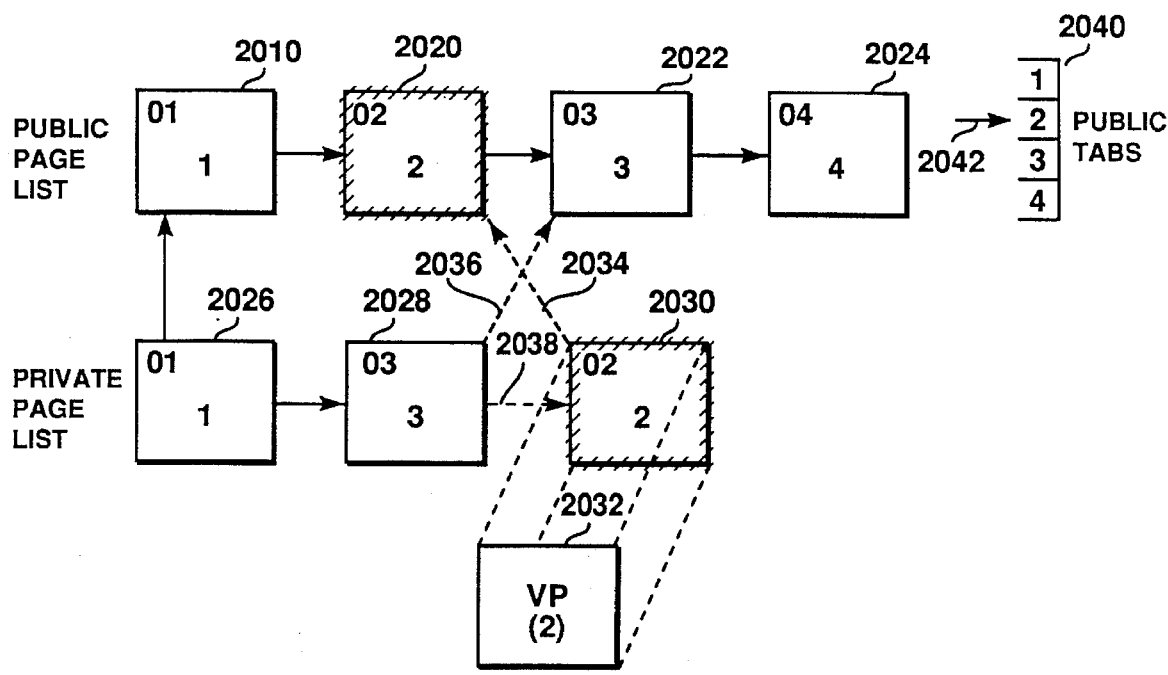
Figure 37:
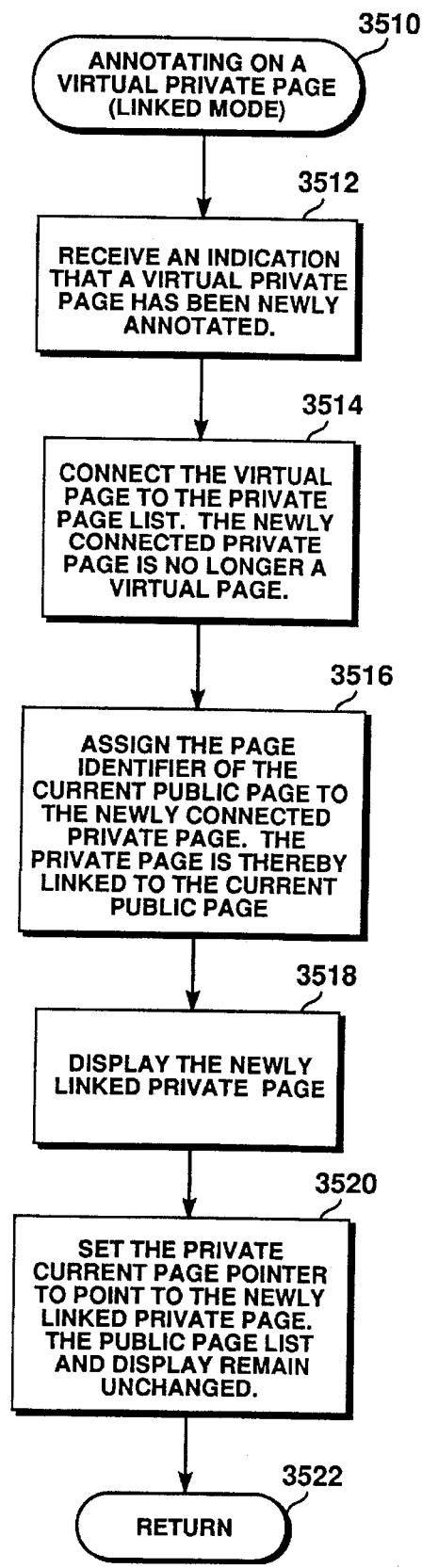

Referring now to FIG. 37, the processing logic for annotating on a virtual private page in a linked mode is illustrated. An example of the operation of this function is illustrated in FIG. 22. In processing block 3512, an indication is received that a virtual private page has been newly annotated. Referring to FIG. 22, virtual page 2032 was formerly an empty page associated with public page 2020. Once virtual page 2032 is annotated, the virtual page (now private page 2030 illustrated in FIG. 22) is connected to the private page list by the generation of pointer 2038 between private page 2028 and the newly annotated private page 2030. After this operation, the newly connected private page is no longer a virtual page (processing block 3514). The page identifier of the current public page is assigned to the newly connected private page. This step is illustrated in FIG. 22 as the generation of link 2034 between newly annotated private page 2030 and its corresponding linked public page 2020. The private page is thereby linked to the current public page (processing block 3516). The linked private page 2030 is displayed in the application private workspace in processing block 3518. The private current page pointer is set to point to the linked private page (processing block 3520). The public page list and application public workspace display remain unchanged. Processing for annotating a virtual private page in a linked mode then terminates through the return bubble 3522.

Figure 38:
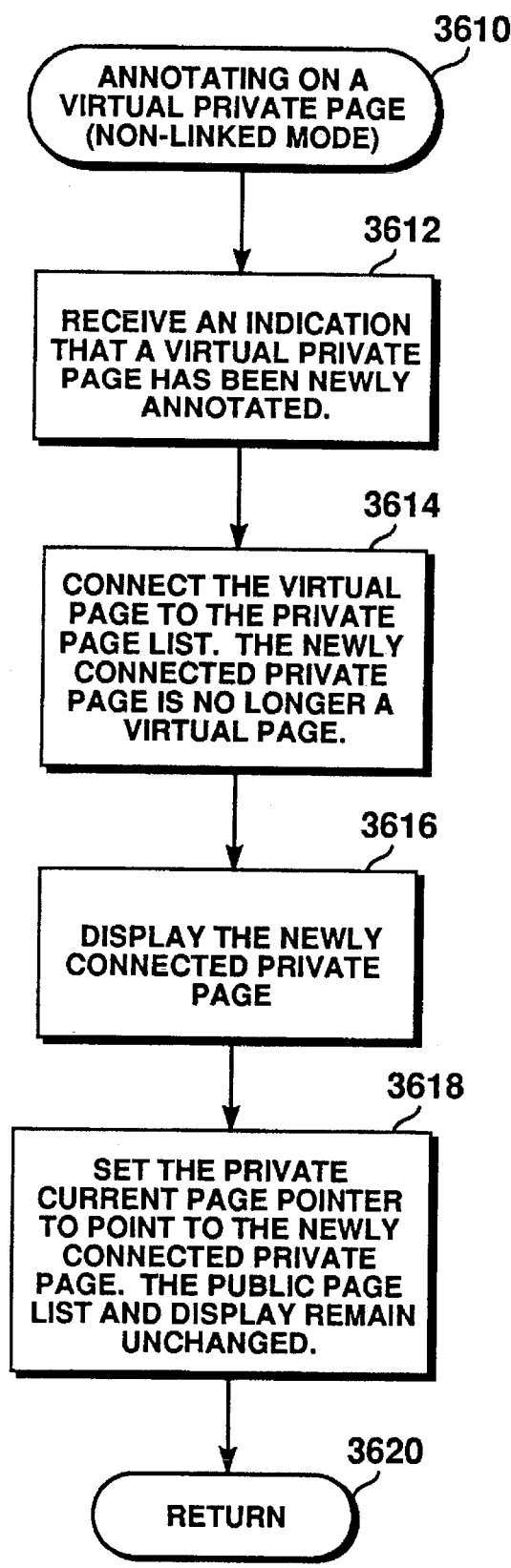

Referring now to FIG. 38, the processing logic for annotating on a virtual private page in a non-linked mode is illustrated. An indication is received that a virtual private page has been newly annotated in processing block 3612. The newly annotated virtual page is connected to the private page list in processing block 3614. The newly connected private page is no longer a virtual page. The newly connected private page is displayed in the application private workspace in processing block 3616. The private current page pointer is set to point to the newly connected private page (processing block 3618). The public page list and the application public workspace display remain unchanged. Processing for this function then terminates through the return bubble 3620.

Figure 39:
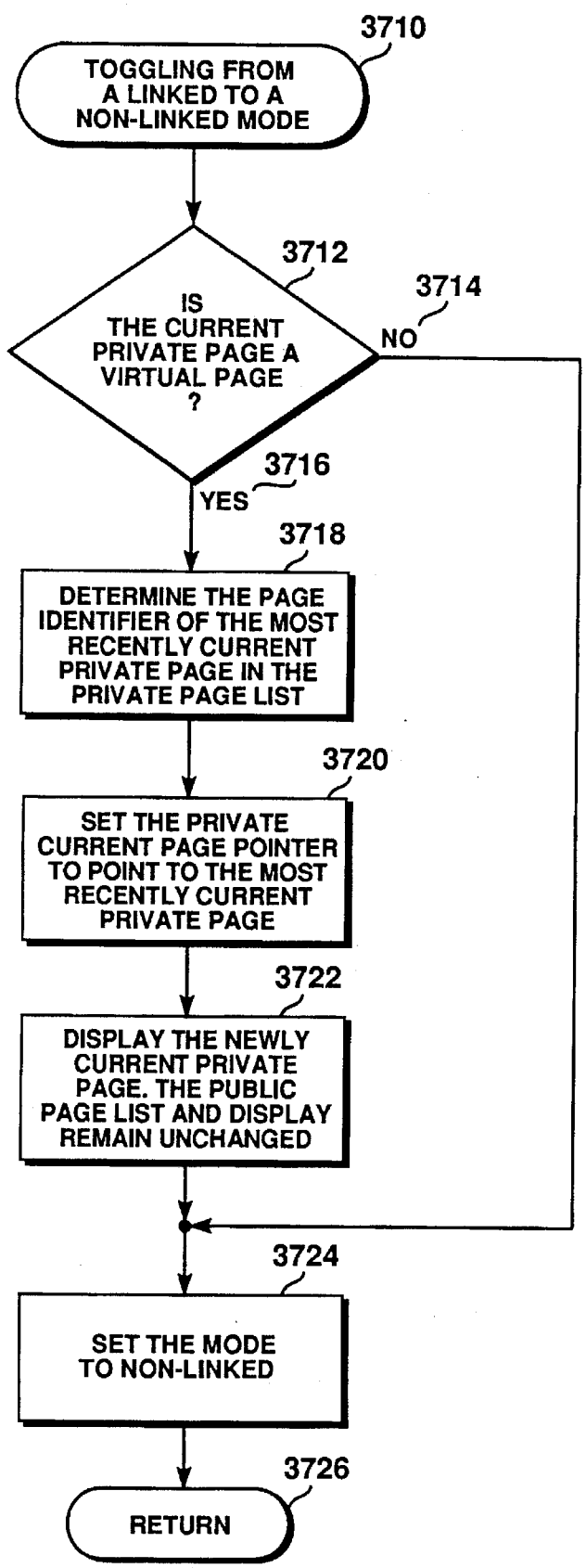

Referring now to FIG. 39, the processing logic for toggling from a linked mode to a non-linked mode is illustrated. If the current private page is not a virtual page, processing path 3714 is taken to processing block 3724 where the non-linked mode is activated. Processing then terminates through return bubble 3726. If, however, the current private page is a virtual page, processing path 3716 is taken to processing block 3718. In this case, the page identifier of the most recently current private page is determined. In the present invention, a virtual private page is not needed in a non-linked mode. Thus, the present invention implicitly selects the most recently current private page for display when a virtual private page is removed. The private current page pointer is set to point to the most recently current private page in processing block 3720. The newly current private page is displayed in the application private workspace in processing block 3722. The public page list and application public workspace display remain unchanged. The non-linked mode is activated in processing block 3724 and processing terminates through return bubble 3726.

Figure 40:
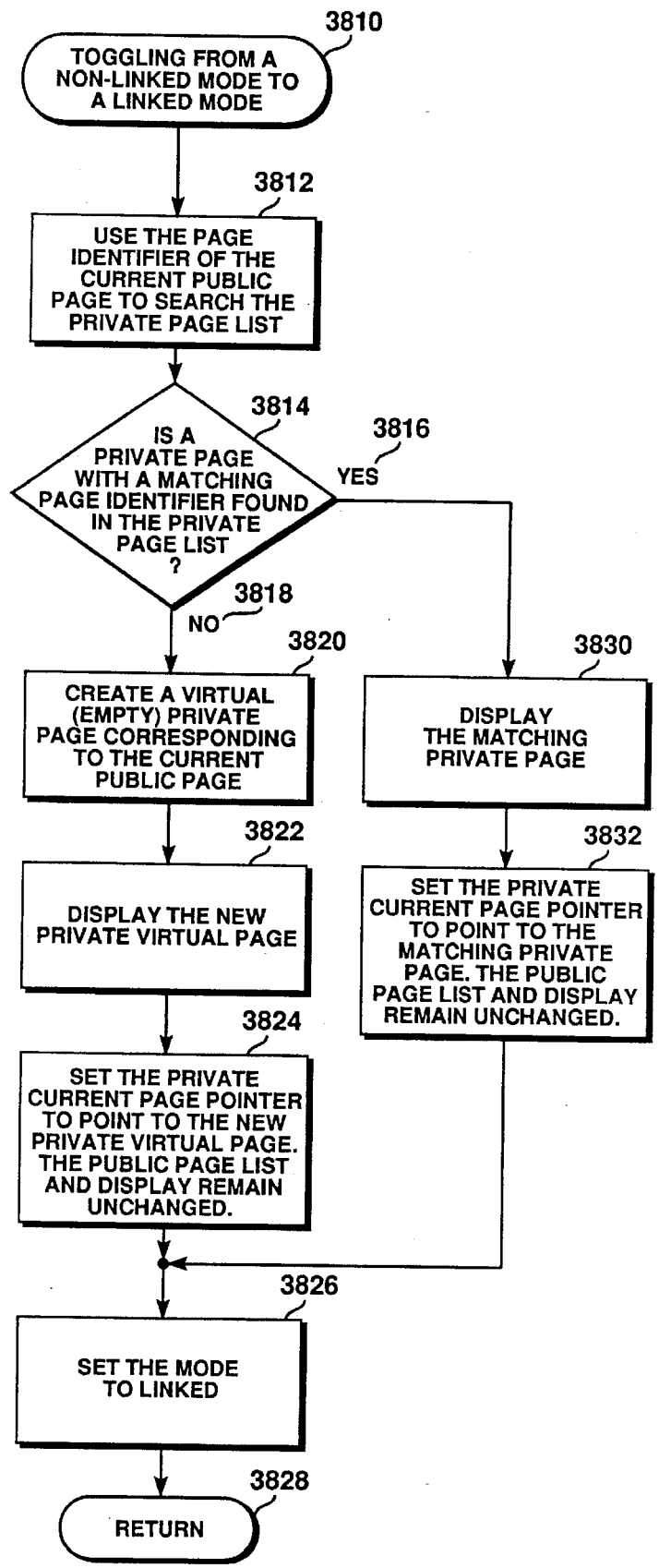

Referring now to FIG. 40, the processing logic for toggling from a non-linked mode to a linked mode is illustrated. In processing block 3812, the page identifier of the current public page is used to search the private page list. If a private page with a matching page identifier is found in the private page list, the matching private page is displayed in the application private workspace (processing block 3830). The private current page pointer is set to point to the matching private page in processing block 3832. The public page list and the application public workspace display remain unchanged. The linked mode is activated in processing block 3826. Processing for a matched private page in the private page list then terminates through return bubble 3828.

Referring now to decision block 3814 in FIG. 40, processing path 3818 is taken if a private page linked to the current public page is not found in the private page list. In this case, a virtual private page is created in processing block

3820. The virtual private page corresponds to the current public page. The new private virtual page is displayed in the application private workspace in processing block 3822. The private current page pointer is set to point to the new private virtual page in processing block 3824. The public page list and the application public workspace display remain unchanged. A linked mode is activated in processing block 3826. Processing for toggling from a non-linked mode to a linked mode then terminates through return bubble 3828 illustrated in FIG. 40.

Thus, an apparatus and method for linking public and private pages in a conferencing system is disclosed. The specific arrangements and methods described herein are merely illustrative of the principles of this invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

We claim:

1. In a computer conferencing system having a plurality of participants coupled by a communication medium, each participant of said plurality of participants having a meeting manager, said meeting manager comprising:

means for collecting public meeting information generated by any of said plurality of participants, said public meeting information including at least one public page of annotations;

means for collecting private meeting information from a local participant in which said meeting manager is resident, said private meeting information being different from said public meeting information, said private meeting information not accessible to said plurality of conference participants other than said local participant, said private meeting information including at least one private page of annotations;

means for selectively linking said private page with said public page, said private page being implicitly accessed when said linked public page is explicitly accessed; and means for selectively activating a linked mode or a non-linked mode, said means for selectively linking only linking said private page with said public page when said linked mode is active, said private page being unlinked with said public page when said non-linked mode is active.

2. The meeting manager as claimed in claim 1 wherein said means for selectively linking further includes means for linking said private page with said public page upon a transition from a non-linked mode to a linked mode.

3. The meeting manager as claimed in claim 1 wherein said means for selectively linking further includes means for unlinking said private page from said public page upon a transition from a linked mode to a non-linked mode.

4. In a computer conferencing system having a plurality of participants coupled by a communication medium, each participant of said plurality of participants having a meeting manager, said meeting manager comprising:

means for collecting public meeting information generated by any of said plurality of participants, said public meeting information including at least one public page of annotations;

means for collecting private meeting information from a local participant in which said meeting manager is resident, said private meeting information being different from said public meeting information, said private meeting information not accessible to said plurality of conference participants other than said local participant, said private meeting information including at least one private page of annotations;

means for selectively linking said private page with said public page, said private page being implicitly accessed when said linked public page is explicitly accessed; and means for creating a virtual private page when said public page is not linked with said private page, said virtual page not containing annotations.

5. In a computer conferencing system having a plurality of participants coupled by a communication medium, each participant of said plurality of participants having a meeting manager, said meeting manager comprising:

means for collecting public meeting information generated by any of said plurality of participants, said public meeting information including at least one public page of annotations;

means for collecting private meeting information from a local participant in which said meeting manager is resident, said private meeting information being different from said public meeting information, said private meeting information not accessible to said plurality of conference participants other than said local participant, said private meeting information including at least one private page of annotations;

means for selectively linking said private page with said public page, said private page being implicitly accessed when said linked public page is explicitly accessed;

means for maintaining a private page list representing a plurality of private pages, said means for maintaining a private page list further including means for linking said plurality of private pages together in said private page list;

means for creating a virtual private page when said public page is not linked with any of said plurality of private pages of said private page list, said virtual page not containing annotations; and means for linking said virtual page with said private page list when an annotation is added to said virtual page.

6. In a computer conferencing system having a plurality of participants coupled by a communication medium, a process for linking public and private pages comprising the steps of:

collecting public meeting information generated by any of said plurality of participants, said public meeting information including at least one public page of annotations;

collecting private meeting information from a local participant in which a meeting manager is resident, said private meeting information being different from said public meeting information, said private meeting information not accessible to said plurality of conference participants other than said local participant, said private meeting information including at least one private page of annotations;

selectively linking said private page with said public page, said private page being implicitly accessed when said linked public page is explicitly accessed; and selectively activating a linked mode or a non-linked mode, said step of selectively linking only being performed when said linked mode is active, said private page being unlinked with said public page when said non-linked mode is active.

7. The process as claimed in claim 6 wherein said step of selectively linking further includes a step of linking said private page with said public page upon a transition from a non-linked mode to a linked mode.

8. The process as claimed in claim 6 wherein said step of selectively linking further includes a step of unlinking said private page from said public page upon a transition from a linked mode to a non-linked mode.

9. In a computer conferencing system having a plurality of participants coupled by a communication medium, a process for linking public and private pages comprising the steps of:

collecting public meeting information generated by any of said plurality of participants, said public meeting information including at least one public page of annotations;

collecting private meeting information from a local participant in which a meeting manager is resident, said private meeting information being different from said public meeting information, said private meeting information not accessible to said plurality of conference participants other than said local participant, said private meeting information including at least one private page of annotations;

selectively linking said private page with said public page, said private page being implicitly accessed when said linked public page is explicitly accessed; and creating a virtual private page when said public page is not linked with said private page, said virtual page not containing annotations.

10. In a computer conferencing system having a plurality of participants coupled by a communication medium, a process for linking public and private pages comprising the steps of:

collecting public meeting information generated by any of said plurality of participants, said public meeting information including at least one public page of annotations;

collecting private meeting information from a local participant in which a meeting manager is resident, said private meeting information being different from said public meeting information, said private meeting information not accessible to said plurality of conference participants other than said local participant, said private meeting information including at least one private page of annotations;

selectively linking said private page with said public page, said private page being implicitly accessed when said linked public page is explicitly accessed:

maintaining a private page list representing a plurality of private pages, said step of maintaining a private page list further including a step of linking said plurality of private pages together in said private page list;

creating a virtual private page when said public page is not linked with any of said plurality of private pages of said private page list, said virtual page not containing annotations; and linking said virtual page with said private page list when an annotation is added to said virtual page.

\* \* \* \* \*

UNITED STATES PATENT AND TRADEMARK OFFICE
CERTIFICATE OF CORRECTION

PATENT NO. : 5,581,702
DATED : December 3, 1996
INVENTOR(S) : McArdle et al.

It is certified that error appears in the above-indentified patent and that said Letters Patent is hereby corrected as shown below:

In the Abstract at [57] in line 1 delete "lining" and insert --linking--

In column 1 at line 22 delete "is"

In column 2 at line 35 delete "fist," and insert --list,--

In column 2 at line 62 delete "convention" and insert --conventional--

In column 7 at line 58 delete "still pending"

Signed and Sealed this

Twenty-ninth Day of April, 1997

Attest:

BRUCE LEHMAN

Attesting Officer

Commissioner of Patents and Trademarks